US010225590B2

(12) United States Patent
Somekh et al.

(10) Patent No.: US 10,225,590 B2
(45) Date of Patent: Mar. 5, 2019

(54) METHOD AND SYSTEM OF DYNAMIC ROUTING OF AGGREGATED ONLINE MEDIA STREAMS

(75) Inventors: Oren Somekh, Bet-Yehoshua (IL); Yehuda Koren, Zichron Yaakov (IL); Natalie Aizenberg, Natanya (IL); Yoelle Maarek, Haifa (IL); Ronny Lempel, Zichron Yaakov (IL)

(73) Assignee: EXCALIBUR IP, LLC, New York, NY (US)

(*) Notice: Subject to any disclaimer, the term of this patent is extended or adjusted under 35 U.S.C. 154(b) by 65 days.

(21) Appl. No.: 13/447,876

(22) Filed: Apr. 16, 2012

(65) Prior Publication Data

US 2013/0275611 A1  Oct. 17, 2013

(51) Int. Cl.
*H04N 21/25* (2011.01)
*H04N 21/258* (2011.01)
*H04N 21/2668* (2011.01)
*H04N 21/6543* (2011.01)

(52) U.S. Cl.
CPC ..... *H04N 21/251* (2013.01); *H04N 21/25891* (2013.01); *H04N 21/2668* (2013.01); *H04N 21/6543* (2013.01)

(58) Field of Classification Search
CPC .. H04L 65/4084; H04L 65/4076; H04L 65/60
USPC ....................................................... 709/231
See application file for complete search history.

(56) References Cited

U.S. PATENT DOCUMENTS

| 7,020,710 | B2* | 3/2006 | Weber et al. ................. 709/232 |
| 7,325,043 | B1* | 1/2008 | Rosenberg ............ G06Q 30/02 707/999.104 |
| 7,912,920 | B2 | 3/2011 | Loomis et al. ............... 709/219 |
| 7,937,488 | B2* | 5/2011 | Gondhalekar et al. ....... 709/231 |
| 8,555,318 | B2* | 10/2013 | Whitehead ............ H04N 7/173 725/44 |
| 2004/0034536 | A1* | 2/2004 | Hughes ......................... 704/278 |
| 2006/0248013 | A1* | 11/2006 | Ebert et al. ..................... 705/51 |

(Continued)

OTHER PUBLICATIONS

RadioActive—Personalized Media Streaming via Dynamic Routing of Aggregated Online Media Streams: Haifa, Israel; 7 pages; no date.

(Continued)

*Primary Examiner* — Michael A Keller
*Assistant Examiner* — Austin J Moreau
(74) *Attorney, Agent, or Firm* — James J. DeCarlo; Greenberg Traurig, LLP

(57) ABSTRACT

Disclosure includes a system, method and architecture to monitor media content streams, e.g., streams of digital encoded media data such as without limitation audio and/or video data, from a number of media content streaming providers and identify media content items from those media content items being streamed by the media content streaming providers for inclusion in a personalized media content stream for a user. In a direct streaming approach, the media content items contained in a stream are available while each item is being streamed by the content provider. In a centralized streaming approach, media content items contained in each media content stream that is currently being streamed by content provider are available for a limited window of time, which can be dependent on buffer length.

28 Claims, 10 Drawing Sheets

(56) References Cited

U.S. PATENT DOCUMENTS

| | | | |
|---|---|---|---|
| 2010/0057928 A1* | 3/2010 | Kapoor | G06F 17/30053 709/231 |
| 2010/0064053 A1* | 3/2010 | Bull et al. | 709/231 |
| 2010/0268361 A1* | 10/2010 | Mantel et al. | 700/94 |
| 2011/0038376 A1* | 2/2011 | Wiemann et al. | 370/394 |

OTHER PUBLICATIONS

Wikipedia, Wisdom of the Crowd, http://en.wikipedia.org/wiki/Crowd wisdom visited Apr. 16, 2012; 6 pages.
Handley,et al. RFC 2974: Session Announcement Protocol (SAP), http://tools.ietf.org/html/rfc2974; Oct. 2000; 19 pages.
Wikipedia, ShoutCast, visited Apr. 16, 2012; 3 pages.
Wikipedia, The Music Genome Project, http://en.wikipedia.org/wiki/Music Genome Project; visited Apr. 16, 2012; 3 pages.
G. Dror, N. Koenigstein, and Y. Koren. Yahoo! music recommendations: Modeling music ratings with temporal dynamics and item. In ACM Conference on Recommender Systems (RecSys'2011), 2011; 8 pages.
A. Field, P. Hartel, and W. Mooij. Personal DJ, an architecture for personalized content delivery. In Proc. of the 10th International World Wide Web Conference (WWW'01), pp. 1-8, Hong-Kong, May 1-5, 2001; 8 pages.
V. Krishnan and S. G. Chang. Customized internet radio. In Proc. 9th Int. World Wide Web Conference (WWW'00), Amsterdam, Netherlands, May 15-19, 2000. Paper 353; 10 pages.

\* cited by examiner

METHOD AND SYSTEM OF DYNAMIC ROUTING OF AGGREGATED ONLINE MEDIA STREAMS

FIELD OF THE DISCLOSURE

The present disclosure relates to personalized media content streaming, and more particularly to monitoring media content streams from media content streaming providers and identifying media content items from those items being streamed for inclusion in a personalized media content stream for a user.

BACKGROUND

A digital device, such as a personal computer, mobile device, etc., has become the norm for users to experience media content items. Once in digital form, a media content item, such as a track or other music item, a movie, clip, podcast, program, advertisement, etc., can be played by the digital device. The media content item might be available for purchase by users via an online site, or brick and mortar establishment. Additionally, media content is available to users via a number of streaming services, which provide online media steams. An internet radio station is one example of a media stream that is available to users. Typically, a user clicks on a hyperlink representing a universal resource locator (URL) to "tune into" the radio station and initiate streaming of the internet radio media content to the user's device. The media content provided by a streaming service is typically not kept or reused by the digital device. The user is confronted with the task of locating a streaming service that provides media content that the user enjoys, and such a task is a significant undertaking given the number of services and streams available to the user. The user typically tunes into a few well known stations or streaming services as a result.

SUMMARY

The present disclosure seeks to address failings in the art and to monitor and identify media content, e.g., digital encoded media data such as digital encoded audio and/or video data and the like, being streamed by a plurality of media streaming services and to provide a personalized media streaming service comprising media content items, e.g., digital encoded track, song or other music item, movies, clips, podcasts, television or other programming, advertisements and the like, from the media content streams being streamed, or otherwise provided, by the media streaming services being monitored. In so doing, the user can access a single service to receive the media content of multiple media streaming services. Rather than providing feedback to multiple entities, the user can provide feedback or otherwise establish the preferences, e.g., via implicit or explicit input, to a single entity, and the user's preferences can be used to identify recommended items from the media content items being streamed by the media streaming services being monitored by the single entity.

In accordance with at least one aspect, a method is provided, the method comprising maintaining, via at least one server computer, a user database comprising user information for a plurality of users, the user information comprising media content user preferences; receiving, via the at least one server computer, a plurality of media content streams from a plurality of streaming media content providers, each media content stream of the plurality comprising a subset of a plurality of media content items; and as the media content streams of the plurality are being received from the plurality of streaming media content providers, the at least one server computer: obtaining metadata for at least a subset of the plurality of media content items; identifying, using the user database and the obtained metadata, a personalized media content stream for each user of a plurality of users, the personalized media content stream comprising at least one media content item from the plurality of media content streams; transmitting, for each user of the plurality, a plurality of universal resource locators to the user's computing device, each universal resource locator identifying a media content stream of the plurality containing a media content item of the personalized media content stream.

In accordance with another aspect, a system is provided, the system comprising at least one server computer comprising one or more processors to execute and memory to store instructions to: maintain a user database comprising user information for a plurality of users, the user information comprising media content user preferences; receive a plurality of media content streams from a plurality of streaming media content providers, each media content stream of the plurality comprising a subset of a plurality of media content items; and as the media content streams of the plurality are being received from the plurality of streaming media content providers: obtain metadata for at least a subset of the plurality of media content items; identify, using the user database and the obtained metadata, a personalized media content stream for each user of a plurality of users, the personalized media content stream comprising at least one media content item from the plurality of media content streams; and transmit, for each user of the plurality, a plurality of universal resource locators to the user's computing device, each universal resource locator identifying a media content stream of the plurality containing a media content item of the personalized media content stream.

In yet another aspect, a computer readable non-transitory storage medium is provided, the media for tangibly storing thereon computer readable instructions that when executed cause at least one processor to: maintain a user database comprising user information for a plurality of users, the user information comprising media content user preferences; receive a plurality of media content streams from a plurality of streaming media content providers, each media content stream of the plurality comprising a subset of a plurality of media content items; and as the media content streams of the plurality are being received from the plurality of streaming media content providers: obtain metadata for at least a subset of the plurality of media content items; identify, using the user database and the obtained metadata, a personalized media content stream for each user of a plurality of users, the personalized media content stream comprising at least one media content item from the plurality of media content streams; and transmit, for each user of the plurality, a plurality of universal resource locators to the user's computing device, each universal resource locator identifying a media content stream of the plurality containing a media content item of the personalized media content stream.

In accordance with one aspect, a method is provided, the method comprising receiving, at a user computing device, a plurality of tuning commands for a plurality of media content streams, each media content stream containing multiple media content items, each tuning command of the plurality including a universal resource locator identifying one of the plurality of media content streams; accessing, by the user computing device for each received tuning command, the media content stream using the universal resource locator to receive a media content item contained in the media content stream; playing, by the user computing device, a first received media content from a first media content stream as part of a personalized media stream; and buffering, by the user computing device, at least one other media content item from at least one media content stream different from the first media content stream while the first media content item is selected for play.

In accordance with another aspect, a user device is provided, the user device comprising one or more processors to execute and memory to store instructions to: receive a plurality of tuning commands for a plurality of media content streams, each media content stream containing multiple media content items, each tuning command of the plurality including a universal resource locator identifying one of the plurality of media content streams; access, for each received tuning command, the media content stream using the universal resource locator to receive a media content item contained in the media content stream; play a first received media content from a first media content stream as part of a personalized media stream; and buffer at least one other media content item from at least one media content stream different from the first media content stream while the first media content item is selected for play.

In yet another aspect, a computer readable non-transitory storage medium is provided, the media for tangibly storing thereon computer readable instructions that when executed cause at least one processor to: receive a plurality of tuning commands for a plurality of media content streams, each media content stream containing multiple media content items, each tuning command of the plurality including a universal resource locator identifying one of the plurality of media content streams; access, for each received tuning command, the media content stream using the universal resource locator to receive a media content item contained in the media content stream; play a first received media content from a first media content stream as part of a personalized media stream; and buffer at least one other media content item from at least one media content stream different from the first media content stream while the first media content item is selected for play.

In accordance with one aspect, a method is provided, the method comprising maintaining, via at least one server computer, a user database comprising user information for a plurality of users, the user information comprising media content user preferences; receiving, via the at least one server computer, a plurality of media content streams from a plurality of streaming media content providers, each media content stream of the plurality comprising a subset of a plurality of media content items; as the media content streams of the plurality are being received from the plurality of streaming media content providers, the at least one server computer: retrieving metadata for at least a subset of the plurality of media content items; temporarily storing, in at least one buffer, at least a portion of each of the plurality of media content streams received from the plurality of streaming media content providers, the portion comprising at least one of the plurality of media content items; creating an index of the at least one buffer, the index identifying, for each of the plurality of media content streams, the at least one of the plurality of media content items temporarily stored in the at least one buffer; identifying, using the user database, the retrieved metadata and the index, a personalized media content stream for each user of a plurality of users, the personalized media content stream comprising at least one media content item from the plurality of media content streams; transmitting, for each user of the plurality, the at least one media content item identified for the personalized media content stream to the user's computing device; and removing, via the at least one server computer, each media content item temporarily stored in the at least one buffer where the media content item has been stored for a predetermined short period of time.

In accordance with another aspect, a system is provided, the system comprising at least one server computer comprising one or more processors to execute and memory to store instructions to: maintain a user database comprising user information for a plurality of users, the user information comprising media content user preferences; receive a plurality of media content streams from a plurality of streaming media content providers, each media content stream of the plurality comprising a subset of a plurality of media content items; as the media content streams of the plurality are being received from the plurality of streaming media content providers, the at least one server computer: retrieve metadata for at least a subset of the plurality of media content items; temporarily store, using at least one buffer, at least a portion of each of the plurality of media content streams received from the plurality of streaming media content providers, the portion comprising at least one of the plurality of media content items; create an index for the at least one buffer, the index identifying, for each of the plurality of media content streams, the at least one of the plurality of media content items temporarily stored in the at least one buffer; identify, using the user database, the retrieved metadata and the index, a personalized media content stream for each user of a plurality of users, the personalized media content stream comprising at least one media content item from the plurality of media content streams; transmit, for each user of the plurality, the at least one media content item identified for the personalized media content stream to the user's computing device; and remove each media content item temporarily stored in the at least one buffer where the media content item has been stored for a predetermined short period of time.

In yet another aspect, a computer readable non-transitory storage medium is provided, the media for tangibly storing thereon computer readable instructions that when executed cause at least one processor to: maintain a user database comprising user information for a plurality of users, the user information comprising media content user preferences; receive a plurality of media content streams from a plurality of streaming media content providers, each media content stream of the plurality comprising a subset of a plurality of media content items; as the media content streams of the plurality are being received from the plurality of streaming media content providers, the at least one server computer: retrieve metadata for at least a subset of the plurality of media content items; temporarily store, using at least one buffer, at least a portion of each of the plurality of media content streams received from the plurality of streaming media content providers, the portion comprising at least one of the plurality of media content items; create an index for the at least one buffer, the index identifying, for each of the plurality of media content streams, the at least one of the plurality of media content items temporarily stored in the at least one buffer; identify, using the user database, the retrieved metadata and the index, a personalized media content stream for each user of a plurality of users, the personalized media content stream comprising at least one media content item from the plurality of media content streams; transmit, for each user of the plurality, the at least one media content item identified for the personalized media content stream to the user's computing device; and remove each media content item temporarily stored in the at least one buffer where the media content item has been stored for a predetermined short period of time.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview example of components for use by a system in accordance with one or more embodiments of the present disclosure.

FIG. 2 provides component examples of a system with which tuning information is transmitted to user devices in accordance with one or more embodiments of the present disclosure.

FIG. 3 provides a direct streaming process flow overview example in accordance with one or more embodiments of the present disclosure.

FIG. 4 provides a direct streaming process flow example in accordance with one or more embodiments of the present disclosure.

FIG. 5 illustrates client-side components in accordance with one or more embodiments of the present disclosure.

FIG. 6 provides component examples of a system with which media content items from media content streams are scheduled and routing to user devices in accordance with one or more embodiments of the present disclosure.

FIG. 7 provides a media stream buffering example in accordance with one or more embodiments of the present disclosure.

FIG. 8 provides a centralized streaming process flow example with which media content items from media content streams are scheduled and routing to user devices in accordance with one or more embodiments of the present disclosure.

DETAILED DESCRIPTION

Figure 1:
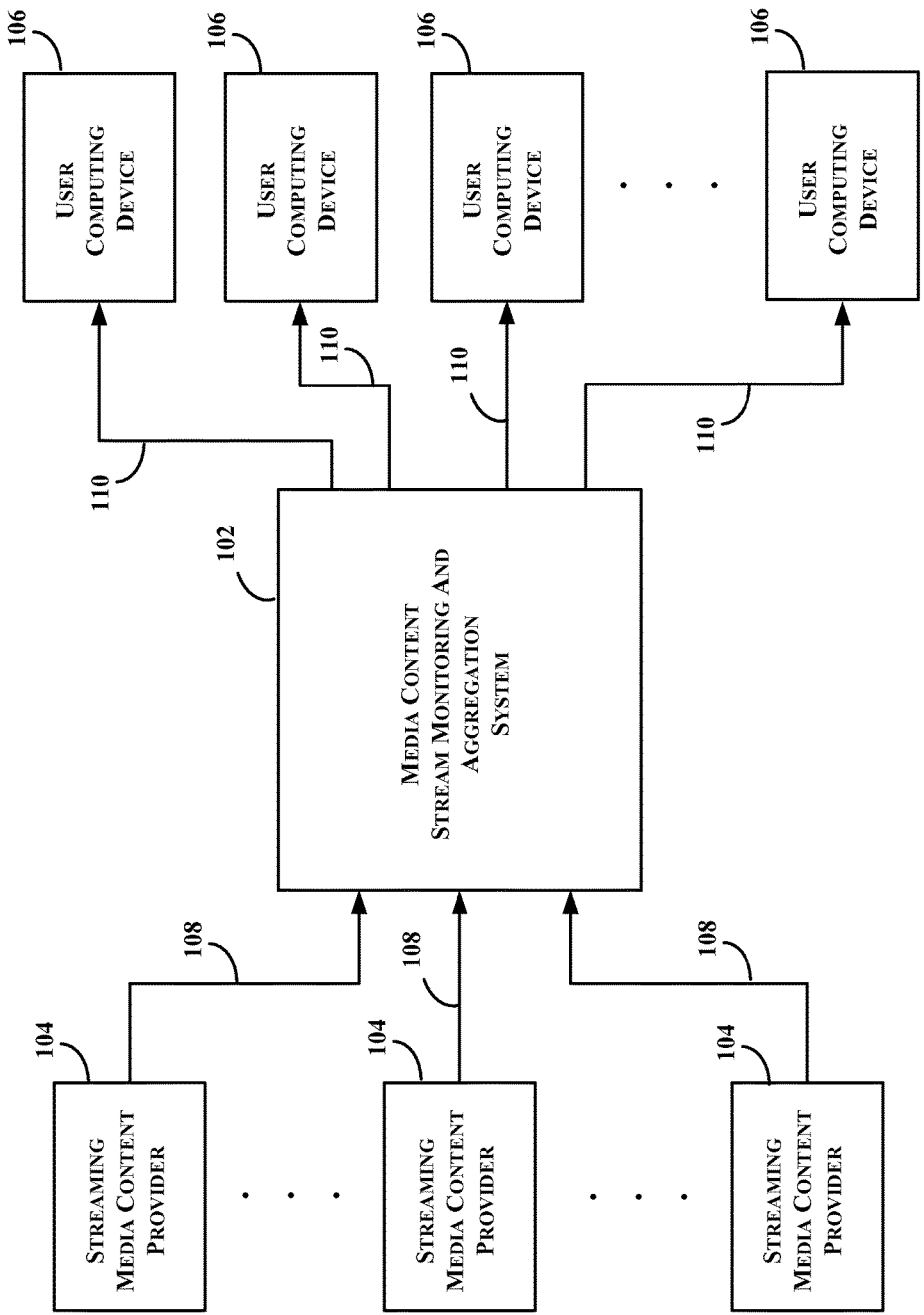

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

The present disclosure includes, inter alia, a system, method and architecture to monitor media content streams, e.g., streams of digital encoded media data such as without limitation audio and/or video data, from a number of media content streaming providers and identify media content items from those media content items being streamed by the media content streaming providers for inclusion in a personalized media content stream for a user. In accordance with a direct streaming approach, the media content items contained in a stream are available while each item is being streamed by the content provider. In accordance with a centralized streaming approach, media content items contained in each media content stream that is currently being streamed by content provider are available for a limited window of time, which can be dependent on buffer length.

A media content item may be encoded using a digital encoding format, including without limitation Moving Picture Experts Group (MPEG or MP), RealAudio, Audio Video Interleaved (AVI), Advanced Audio Coding (AAC), Ogg Vorbis and the like.

While one or more embodiments of the present disclosure may be discussed with reference to a particular type of media, media content or media content item, the present disclosure is not limited to one particular type of media. Embodiments of the present disclosure can be used with any type media, media content or media content item, including without limitation digital content such as audio, video, multimedia, music, tracks, movies, programs, etc.

A media stream can be considered to be a collection of media content, and an item in a collection of media content, such as without limitation a media stream, may be referred to as an "item of media content" or a "media content item," and may be retrieved from the media stream or collection.

In accordance with one or more embodiments, a reference (e.g., a universal resource locator, or URL) to a media content stream containing each media content item or media content items, is transmitted to the user's device. By way of a non-limiting example, where a reference is transmitted to the user's device, the reference or URL transmitted to the user's device can be used at the user's device to "tune to" the media content steam, e.g., access a provider's media content stream as it is being streamed by the provider using the reference or URL, and information forwarded with the reference, e.g., time code, track identifier, song identifier and the like, can be used to locate the point in the media content stream associated with an identified media content item to begin play at a point in the media content stream corresponding to the identified media content item.

In accordance with one or more embodiments, a track's transition time within a stream may be identified using the time of transition (or receiving) to new or different metadata. Alternatively or additionally, the time of transition from one track to another can be identified by analyzing the content, using digital signal processing, and/or using human editors, such as in a case that the time difference between metadata and track transition is constant for each source. Typically, a metadata change occurs before a track transition. It is possible that the metadata change can occur after a track transition. Where this occurs, the user may miss an initial portion, e.g., the track head, of the track. In accordance with one or more embodiments, to avoid the user missing the initial portion of a track, the system can extract an initial few seconds of the track from the media stream, add the initial portion to the tuning command send to the user device, and instruct the media player on the user device to stitch the initial portion at the head of the remaining portion of the media content item received in the incoming stream at the user device.

In accordance with embodiments, a play schedule is maintained for the identified media content items, and the reference to the media content stream containing an identified media content item and information to locate the media content item in the media content stream are transmitted to the user device in accordance with the play schedule.

In accordance with one or more alternate embodiments, each of the identified media content items identified for a user's personalized media stream can be transmitted to the user's device. In accordance such alternate embodiments, a play schedule is maintained for the identified media content items that are to be transmitted to the user's device.

In accordance with one or more embodiments, user feedback, such as and without limitation user ratings input, user player control activity, such as without limitation rewind, skip, volume up, volume down, etc., is received and used to update and maintain user preference information. The user preference information can be input together with the snapshot of the media content streams, e.g., information identifying the media content items currently being streams, to a recommendation system to identify the media content items for a user.

FIG. 1 provides an overview example of components for use by a system in accordance with one or more embodiments of the present disclosure. In accordance with embodiments of the disclosure, the system 102 implements a direct streaming approach and provides tuning information or commands to a client device, which buffers media content items for play at the client device. In accordance with one or more embodiments, system 102 implements a centralized streaming approach and has streaming service provider capabilities to stream media content items to the client device.

In accordance with one or more embodiments, each provider 104 transmits a media content stream 108. In accordance with one or more such embodiments, system 102 receives each stream 108 in the same manner as a user. System 102 can access a media content stream from a provider 104 using a URL supplied by the provider 104, for example. In accordance with one or more embodiments, system 102 can receive thousands of streams 108 from providers 104. System 102 monitors the streams 108 and the media content items contained in the streams 108 being streamed by providers 104 and can identify media content items for inclusion in a personalized media stream, e.g., personalized internet radio station stream, for a user. The personalized media stream comprising media content items selected by system 102 from the media content items being streamed in streams 108. As system 102 receives each stream 108 that is being streamed by a provider 104, system 102 identifies one or more media content items from the one or more streams 108 being streamed by providers 104 for inclusion in a personalized media stream for a user.

As is described in more detail below, system 102 makes use of metadata of the media content items to identify the media content items for a user's personalized media stream. System 102 makes the personalized media stream available to the user via a computing device 102. In accordance with one or more embodiments and a direct streaming approach, system 102 can make the personalized media stream available by transmitting tuning information, information transmitted in a tuning command, to the computing device 102. The computing device 102 uses the tuning information to tune to each steam 108 containing a media content item for the user's personalized media stream. In accordance with one or more embodiments and a centralized streaming approach, system 102 transmits the media content items that comprise the user's personalized media stream.

In accordance with one or more embodiments, device 102 includes a media player capable of playing back media content, items and includes play controls, such as play, pause, stop, replay, skip, volume, etc. In accordance with one or more embodiments, the media player, or another component of device 102, such as a browser, can include an ability to receive ratings information, an on-demand or other request for media content, user settings and preferences. Device 106 can notify system 102 of feedback received from the user, e.g., the user's interaction with the media player's controls, the user's ratings input, requests, etc.

In accordance with a centralized streaming in one or more embodiments, system 102 causes the one or more media content items identified for the user's personalized media stream to be made available to the user via a user computing device 106 by transmitting, via transmission 110, the identified one or more media content items to the user's computing device 106.

In accordance with a direct streaming in one or more embodiments, system 102 transmits tuning commands via transmission 110 to the user's computing device 106. The tuning information identifies each stream 108 containing an media content item identified by system 102, together with information to locate the identified media content item in the stream 108. By way of a non-limiting example, the information identifying stream 108 can be a URL, or other resource reference. By way of a non-limiting example, the user's computing device 106 receives the portion of a stream 108 that contains a media content item for the user's personalized media stream. The tuning information received by user device 106 is used by the device to switch to each stream 108 containing a media content item for the personalized media stream.

Advantageously and in accordance with one or more embodiments, personalized media streams can be made available to each user of system 102 without maintaining a large database, or databases, of media content items, since the media content items identified for each personalized media stream are currently being streamed by providers 104, with the streams 108 being monitored and one or more media content items from the streams being identified for inclusion in each user's personalized media stream in, real time or virtual real time, synchronization with the transmission of the streams 108 by the providers 104. Advantageously and in accordance with one or more embodiments, a personalized media stream can be designed for each of a plurality of users automatically for each user; so that there is no need for the user to select a media stream or a portion of a media stream. In accordance with one or more embodiments, advantageously, a user database maintained in accordance with one or more embodiments of the present disclosure, e.g., by system 102, comprises a plurality of user profiles, each profile corresponding to a user of system 102; the plurality of user profiles being available for use in identifying a personalized media stream for a given user. As is described in more detail below, the media content items used for a user's personalized media stream can be identified from user preferences, e.g., preferences stored in a user profile.

In accordance with one or more embodiments, a user may make an on-demand request. By way of some non-limiting examples, the request can be for a specific media content item, artist, album, track, genre, movie, program, etc. Where the system 102 receives a request from a user and the request can be satisfied, in whole or in part, by one or more media content items found in stream(s) 108 from provider(s) 104 being monitored by system 102, the one or more media items that satisfy the request can be included in the user's personalized media stream by system 102. Whether or not a media content item is found in the stream(s) 108 being monitored by system 102, the user's request can be noted in the user's profile and used to make recommendations of media content items for the current and/or a future personalized media stream for the user, e.g., in the future when the media content item is being streamed by a provider 104 in a stream 108 that is being monitored by system 102. In addition to preferences related to media content items of interest to the user, the user profile might include predefined preferences, such as without limitation, a preference to receive periodic, e.g., hourly, reports, e.g., news, traffic, etc. reports, advertisements, and the like, which preferences can be taken into account by system 102 in generating a personalized media stream for the user.

In the example of FIG. 1, as well as any of the other figures provided herein, functionality described in connection with a single component can be performed by more than one component; similarly, two or more components can be combined such that the functionality described in connection with the two or more components is performed by a single component.

Direct Streaming

Figure 2:
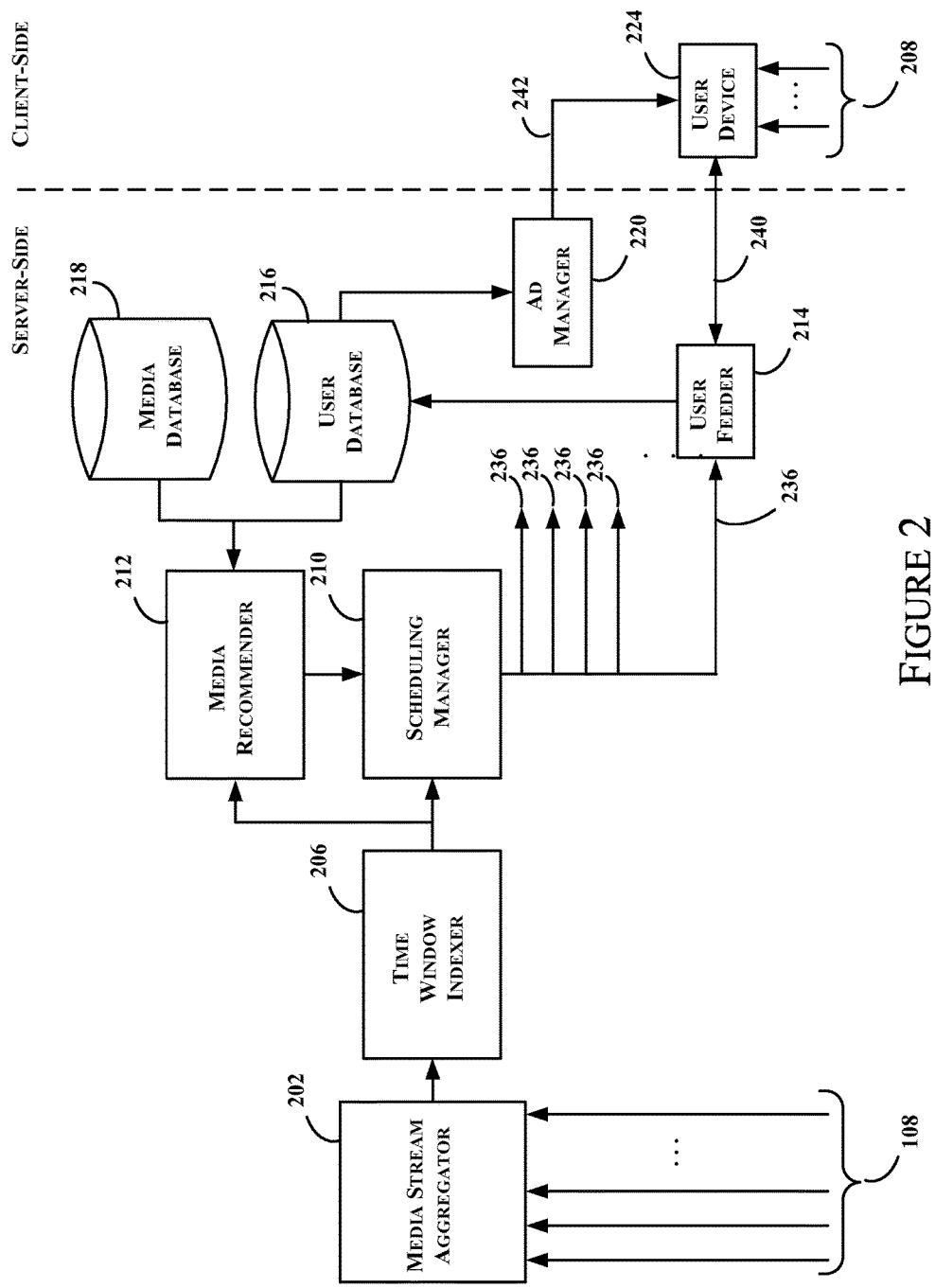

In accordance with one or more embodiments, system 102 transmits tuning information, including the URLs containing a media content item identified for a user's personalized media stream, to the user's device 106. The user's device uses the tuning information to access a media content item identified by system 102 for the user's personalized media stream to access the media content item contained in a media stream being streamed by a provider 104. FIG. 2 provides an example in which, in accordance with one or more embodiments, the system 102 transmits information, e.g., one or more tuning commands including tuning information, that can be used by the media player executing on a user device 224 to access a media stream being streamed by provider 104 containing a media content item identified by system 102 for inclusion in the user's personalized media stream, and information for locating the media content item in the media stream. In accordance with one or more embodiments, direct streaming includes transmitting the tuning information to the user device rather than transmitting the media content items.

Component examples for use in transmitting tuning information to user devices in accordance with one or more embodiments of the present disclosure are provided in FIG. 2. In accordance with one or more embodiments, the system architecture shown in FIG. 2 functions to transmit URLs, or other references, for media streams 108 containing media content items identified for a user's personalized media stream by system 102 to the user device 224. Advantageously, the user device 224 need only receive those media streams 108 containing media content items identified by system 102 for the personalized media stream. As yet a further advantage, the user device 224 need only receive that portion of a media stream 108 containing an identified media content item. By way of some non-limiting example, the user device 224 can access the media content stream 108 in time to retrieve an identified media content item and then discontinue receipt of the media content stream 108 once the identified media content item is received by the user device 224. Resource, e.g., storage and processing unit, consumption can be minimized, due at least in part to lower storage and transmission needs for the client device 224.

In the illustration provided in FIG. 2, media streams 108 that are being received by media stream aggregator 202 and the media streams 208 that are being received by user device 224 are being streamed by content providers 104. While it is possible for user device 224 to receive all of the same media streams received by media stream aggregator 202, the media streams 208 received by the user device 224 can be reduced to those media content streams 108 containing media content items identified for inclusion in the user's personalized media stream by the system 102. Since system 102 is monitoring all of media content streams 108 and is effectively identifying the media content streams containing the media content items to be included in the user's personalized media stream that is to be played at the user device 224, it is not necessary for user device 224 to receive all of the media content streams 108 received by media aggregator 202. It is also possible, in accordance with one or more embodiments of the present disclosure, that user device 224 can receive one or more media streams 208 that are not included in the media streams 108.

The media stream aggregator 202 is connected to the content providers 104 and is receiving the media content streams 108 streamed by the providers 104. From the perspective of the provider 104, it transmits the media stream in a same manner it would transmit a media stream to the user device 224. Media stream aggregator 202 extracts metadata from the media streams 108. Time window indexer 206 receives and collects the metadata from the media stream aggregator 202 and updates the media content index for each media content stream 108. In accordance with one or more embodiments, a media content index maintained by time window indexer 206 includes information for identifying a location of a media content item in a media stream, e.g., media streams 108 and 208. In accordance with one or more embodiments, the index maintained by time window indexer 206 can include information identifying the media stream 108, e.g., a URL or other reference, as well as information identifying a media content item within the media stream 108, e.g., a timestamp. The timestamp can comprise information that can be used to locate the media content item in the media stream 108 and/or media stream 208.

By way of a non-limiting example, the media content stream 108 may be formatted in accordance with a protocol that embeds metadata in the stream 108, such as without limitation the Shoutcast™ protocol. In such a case, the stream 108 includes both metadata and media data, e.g., MP3 data. By way of a non-limiting example, a metadata block might be embedded in the stream 108 every n bytes of media data contained in the stream 108. The portion of the stream 108 that contains the metadata may include a value indicating the length, e.g., the byte-length, of the metadata block. Metadata can be any information, including without limitation information associated with the stream 108 and/or a media content item contained in the stream 108. Some non-limiting examples of metadata that can be extracted from the stream 108 include track title, artist name, album, genre, description, etc. In accordance with one or more embodiments, the system 102 extracts the metadata block from the stream 108. By way some non-limiting examples, the metadata can be a string of the form StreamTitle=title, where title is the title of the media content item.

The media recommender 212 uses snapshot information received from the time window index generated by indexer 206, which provides a snapshot of the media content items received in a time frame or window, information from the media database 218, and user information, including user feedback, from the user database 216 to generate a recommended list of media content items residing within the time window for each user's personalized media stream. In accordance with one or more embodiments, the system 102 does not store media content items. Media database 218 stores data other than the content of a media item, such as media content item metadata, and optional additional data, that may be used by media recommender 212 in making recommendations.

Scheduling manager 210 receives recommendations from media recommender 212, updates its scheduling plan, and sends tuning information, e.g., a URL of the media stream 108 and information to locate the identified media content item in the media stream 108, for each media stream including a recommended media content item selected for a user's personalized media stream to the user feeder 214 for transmission 240 to user device 224.

In accordance with one or more embodiments, an ad manager 220 can send in-band audio ads and/or out-of-band, e.g., display, ads to the user device 224 via transmission 242. In accordance with one or more embodiments, ad manager 220 can use information from user database 216 to identify ads to be transmitted to user device 224.

In accordance with one or more embodiments, two ad types are provided: (1) in-band video/audio ads that are assorted via the streaming mechanism; and (2) display ads that can be transmitted via the command/status channel and can be presented to the user without interfering with the media stream, e.g., put on the player skin or displayed in a popup window. In any case, regardless of ad type, an ad can be matched to the current media content item and/or user profile, for example.

By way of some non-limiting examples, the user database 216 can be used to identify ads targeted for presentation to a given user. An approach to presenting targeted advertisements includes employing demographic information and/or characteristics (e.g., user age, income, sex, occupation, geographic location, etc.) for predicting user behavior and/or user interests. The demographic targeting can be based an understanding of user interests by demographic groups, for example. Advertisements may be presented to users in a targeted audience based at least in part upon predicted user behavior(s) and/or interests. Another approach includes profile-type ad targeting. In this approach, user profiles specific to a user may be generated to model user behavior and/or interests, for example, by collecting the user's media content feedback including tracking a user's interaction with the media player, and/or by tracking the user's path through a web site or network of sites, and compiling a profile based at least in part on the user's behavior. A correlation may be identified, such as for user purchases, for example. An identified correlation may be used to target potential purchasers by targeting content or advertisements to particular users.

Each user feeder 214 is connected to a user's media player executing on the user's user device 224, and communicates tuning information, as well as controls and status messages, via transmission 240. Additionally, each user feeder 214 receives information such as user feedback and/or user behavioral information via transmission 240, and updates the user database 216 in accordance with the received information.

In accordance with one or more embodiments, the media player or other component residing on the user device 224 can access, or tune into, multiple ones of media stream 208 to fetch the media content items using the tuning information provided by user feeder 214. This can be beneficial where, as is typically the case, there is no synchronization of media content items between the media streams 208. In accordance with one or more embodiments, the media content currently being played by the media player is stored in a local buffer, e.g., a jitter buffer; one or more additional buffers can be used on the user device 224 to fetch and store one or more media content items identified in the transmission(s) from user feeder 214, each media content item being a potential next media content item to be played by the media player. Where the current media content item play is completed, the media player begins playing a next media content item, which is selected from one of the additional buffers, e.g., one of the additional buffers that is filled, or full. An empty buffer, e.g., a buffer that stored a media content item that has been played by the media player, is available to store a fetched media content item.

In accordance with one or more embodiments, while the media player executing on the user device 224 can play the media content items according to a schedule set by the scheduling manager 210, it can be configured to have the ability to alter the schedule as conditions warrant. By way of some non-limiting examples, the media player may modify the schedule to address network transmission delays, which may make the next scheduled media content item unavailable for play, the media player may modify the scheduled order and/or replace one media content item for a "better"

media content item, etc. By way of a non-limiting example, the user feeder 214 can instruct the user device 224 to access a "better" media content item; a media content item that has a higher ranking than a next scheduled media content item. By way of another non-limiting example, the "better" media content item can be one that is specifically requested by the user, e.g., an on-demand media content item request. Where there are no buffers available for a media content item that is to be or is being fetched by the media player, the media player may dump, or purge, the contents of an otherwise unavailable buffer. The selected buffer may be temporarily storing a media content item that has a lower ranking than the media content item that the media player is fetching, or is about to fetch. By way of a non-limiting example, the media player may dump the contents of the buffer storing a lower ranked media content item to make room for a higher-ranked media content item. The number of buffers can be configurable; the more buffers the greater the likelihood that the media player can provide a smooth play experience for the user, and can support an ability to skip media content items by the user.

It is beneficial to begin fetching a media content item as soon as possible so that the media content is available for play when selected by the media player. As such, it is beneficial for the media player to receive the tuning information, e.g., media stream reference and media content item identification information, far enough in advance to be able to access the media stream and fetch all or a sufficient portion of the media content item from the media stream to begin playing the media content item as scheduled. The time needed to make a connection with a provider's 104 media content stream may be unacceptably long, e.g., the media player is unable to fetch an initial portion, e.g., the head, of the media content item, which results in the initial portion being missed during play. In such a case, it may be necessary to, for example and without limitation, play another media content item to provide additional time to fetch the media content item, provide the tuning information earlier and thereby allow more time for the user device 224 to fetch before the media content item is scheduled for play, eliminate the media stream from consideration, etc., to address the situation. The status information received from the user device 224 can include information to identify issues, e.g., delays in connection and/or fetching, which can be used by the system to address the issue as needed. As discussed above, it is contemplated in accordance with one or more embodiments that an initial or head portion of a track might be sent by system 102 with the tuning information to the user device 224.

In accordance with one or more embodiments, the user device 224 can perform some level of content analysis to improve the smoothness of the media item transitions. By way of a non-limiting example, the media player can perform content analysis to identify track transitions in streams where the metadata and the content are not sufficiently synchronized. Alternatively, in accordance with one or more embodiments, where a reference to the media stream 108 is forwarded to user device 224, transition information can be forwarded to the user device 224 to assist in locating a media content item in a media stream 108 at the user device 224.

In accordance with one or more embodiments, a duration of each media content item can be identified and retained, e.g., in the media database 218. Where the media database 218 is missing duration information for a media content item and an external database has the duration information, the duration information can be retrieved from the external database. An estimate of the media content item's duration can be the time elapsed between metadata changes surrounding the media content item in a media stream or streams, for example. Multiple estimates can be gathered for a given media content item across multiple media streams. Usually such estimates provide an upper bound to the true duration, and when collectively analyzed can be expected to produce a robust estimate. As yet another alternative, content analysis can be used to identify the beginning and ending of a media content item.

Figure 3:
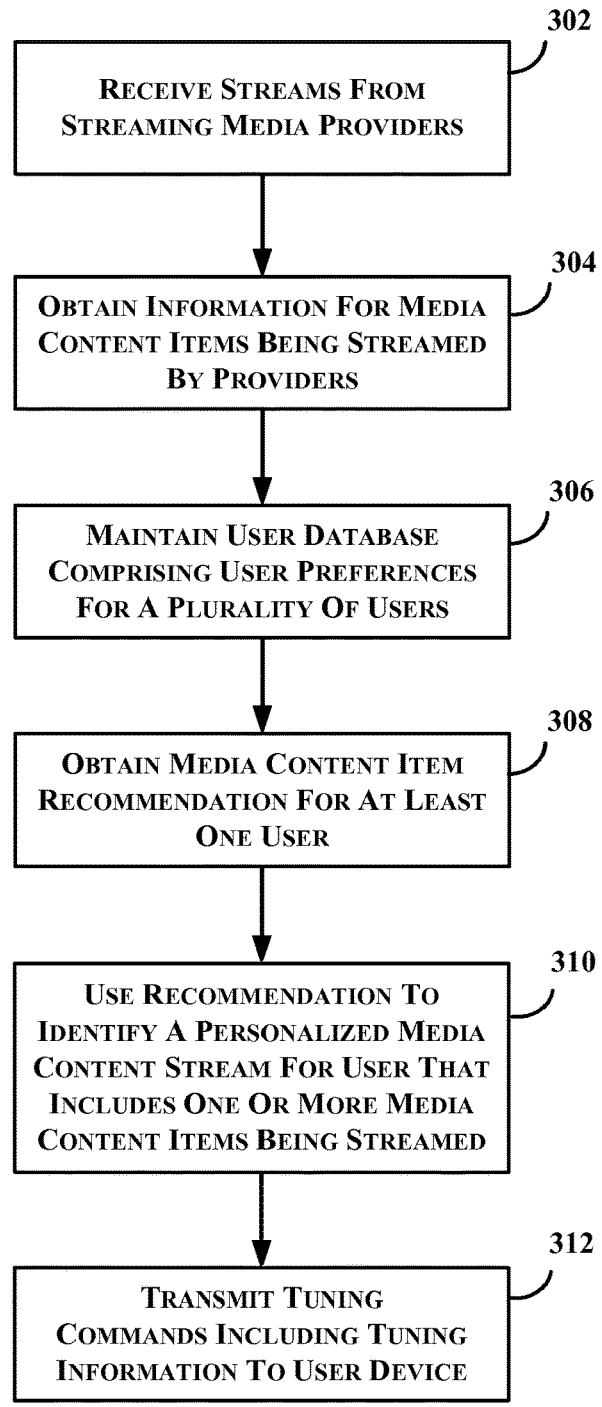

FIG. 3 provides a direct streaming process flow overview example in accordance with one or more embodiments of the present disclosure. In accordance with one or more embodiments, the process can be implemented by system 102. At step 302, media streams 108 are received by system 102 from providers 104. A media stream 108 includes the digital encoded media content items and information, e.g., metadata, about at least some of the media content items included in the media content stream 108. At step 304, information about each media content item in the received media streams 108 is extracted from the media streams 108 and is stored, e.g., stored in media database 218. At step 306, a user profile or other information store is maintained for each user of system 102. A user profile can include information indicating a user's preferences, e.g., media content preferences.

At step 308, media content item recommendations are received, e.g., by scheduling manager 210 from media recommender 212. As discussed herein, in accordance with one or more embodiments, recommender 212 uses user database 216, which includes a user's user profile and the time window index maintained by indexer 206 identifying the media content items from media content streams 108 to identify the media content items to be included in the media content item recommendation for a user. At step 310, scheduling manager 210 identifies media content items from the received media content streams 108 for inclusion in a user's personalized media content stream. At step 312, system 102 makes the user's personalized media content stream available for play at the user's computing device 224 via the user feeder 214 by transmitting to the user device 224 tuning information, including a URL or other reference to a media content stream 208 containing a media content item included in the personalized stream. The user device 224 uses the tuning information to access a specific media content item in the media content stream, as identified by the information provided in the tuning command or information provided by user feeder 224.

Figure 4:
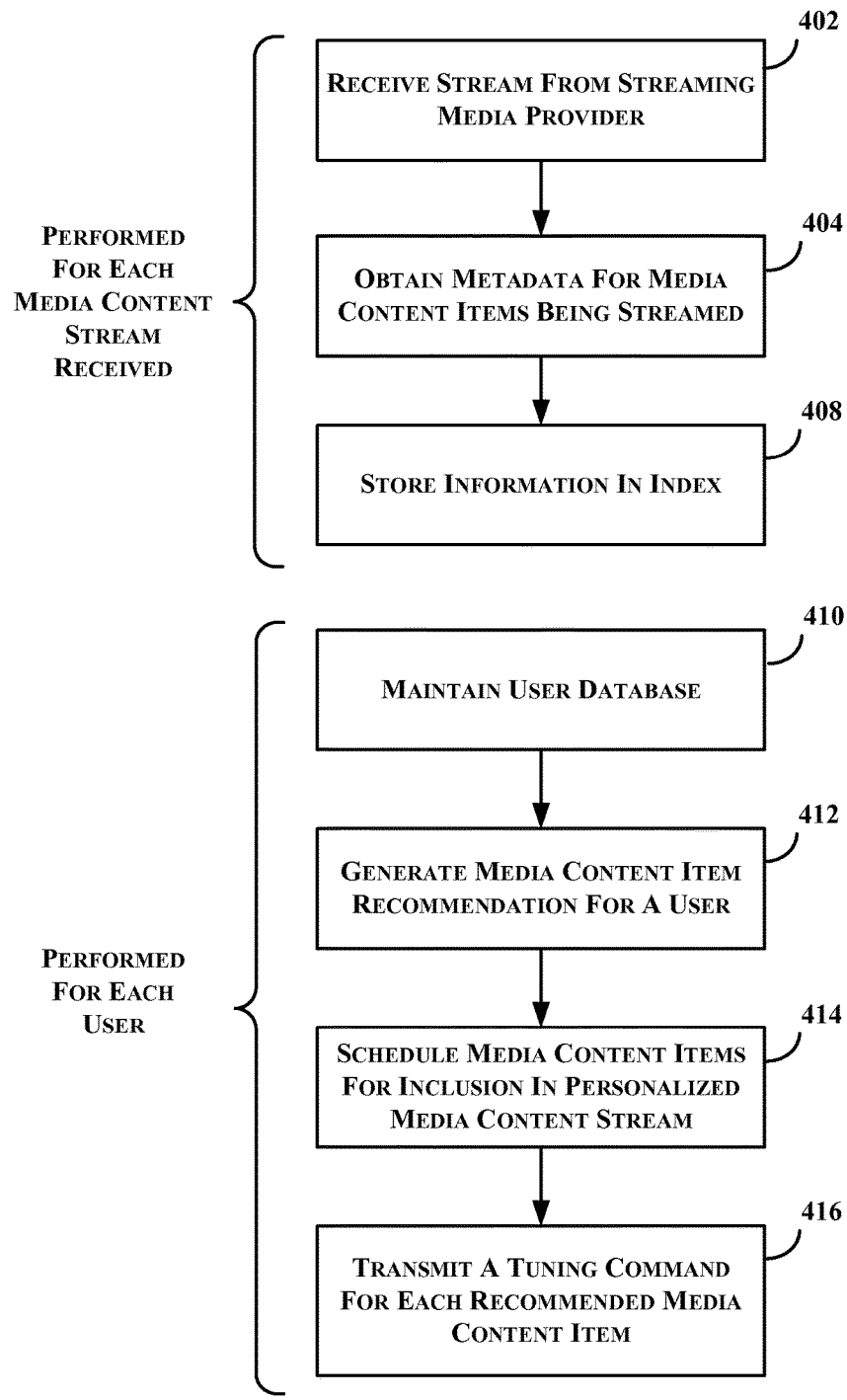

FIG. 4 provides a direct streaming process flow example in accordance with one or more embodiments of the present disclosure. The process flow can be implemented as functionality of the server-side components shown in FIG. 2, for example. In the example shown in FIG. 4, steps 402, 404 and 408 are performed for each media content stream 108 received by system 102; and steps 410, 412, 414 and 416 are performed for each user for which a personalized media stream is to be generated, e.g., each user logged in or otherwise accessing the system 102, such as via a web site or web page. Of course it should be apparent that the client side can be implemented by any type of application, including a web application or dedicated application, for example.

At step 402, media stream aggregator 202 receives streams 108 from providers 104. At step 404, media stream aggregator 202 extracts metadata for media content items being streamed in a media stream 108 from the media stream 108. At step 408, the metadata is stored, e.g., time window indexer 206 receives and collects the metadata from the media stream aggregator 202 and updates the media content index for each media stream 108. In accordance with one or more embodiments, a media content index maintained by time window indexer 206 includes information for identifying a location of a media content item in a media stream, e.g., media streams 108 and 208. In accordance with one or more embodiments, the index maintained by time window indexer 206 can include information identifying the media stream 108, e.g., a URL or other reference, as well as information identifying a media content item within the media stream 108, e.g., a timestamp. The timestamp can comprise information that can be used to locate the media content item in the media stream 108 and/or media stream 208.

At step 410, a user database, e.g., database 216, is maintained and includes user profiles. Each user profile can include user preferences including media content preferences. At step 412, a media content item recommendation is generated, e.g., by media recommender 212. The media content item recommendation can be generated in response to the user logging into system 102 and/or accessing a web page provided by system 102. In accordance with one or more embodiments, media recommender 212 uses the index maintained by time window indexer 206 and user information, including user preferences, from the user database 216 to generate, for each user's personalized media stream, a recommended list of media content items from the media content items indexed by time window indexer 206, which identifies the media content items currently being streamed by one or more content providers 104 when the recommendation is being generated for a user.

At step 414, scheduling manager 210 receives the media content item recommendations from media recommender 212, and selects media content items from the index maintained by time window indexer 206 and identified by media recommender 212 for the user. Scheduling manager 210 can select media content items using a score or ranking information associated with each media content item which identifies a level or likelihood of interest by the user in the media content item. The scheduling manager 210 can also take into account sound recording performance restrictions, such as those that might be imposed in connection with the Digital Millennium Copyright Act or other. The scheduling manager 210 may also schedule media content items for inclusion in a user's personalized media content stream using on-demand or other requests made by the user.

At step 416, for each media content item scheduled by scheduling manager 210, a tuning command including information to tune to a stream 208 is transmitted to the user device 224 via user feeder 214.

In accordance with one or more embodiments, the user may wish to limit media content item play to one or more specific genres. Genre information may be available for extraction as part of the metadata for a media content item by media stream aggregator 202 or 202, available from a media database 218 or other, e.g., external, database such as without limitation a database available from Yahoo! Music, and the like. Additionally or alternatively, genre information for a media content item can be determined using a classification scheme. By way of a non-limiting example, where the media content item is a track, there is typically a set of features, which may include such feature information as a latent space representation such as may be defined by a collaborative filtering model, play-time distribution over stations, labels of adjacently played tracks, and the like. A classifier, such as without limitation a multi-class classifier, can be trained using the media content items having know feature and genre information, and used to assign a genre for a given media content item using the feature information for the given media content item. For example, the feature information for the given media content item is input to the classifier, which identifies one or more possible genres for the media content item; where more than one genre is identified the classifier can output a ranking or probability for each genre.

In accordance with one or more embodiments, the user device 224 receives tuning commands, and uses the tuning information from the tuning commands to tune to media content streams 408 and receive the media content items identified by system 102 for the user's personalized media content stream. In accordance with one or more embodiments, the user device 224 uses a number of buffers to store the media content items identified by system 102 for inclusion in the user's personalized media stream.

By way of a non-limiting example, the media content items can be tracks containing in different Internet radio station streams. Buffers can be used to buffer tracks from different stations, and synchronize the tracks. By way of a non-limiting example, track transitions for one stream 208 may not be synchronized with track transitions for another stream 208, and the buffers can be used to temporarily store tracks and address the track transition differences.

Additionally, buffers can improve media content item recommendation, e.g., while one media content item is being received by one buffer, a next media content items can be selected for the personalized media content stream. As yet another non-limiting example, buffering enables the user to skip media content items, tracks. By way of a non-limiting example, the user may skip tracks up to the number of buffers minus 1.

Figure 5:
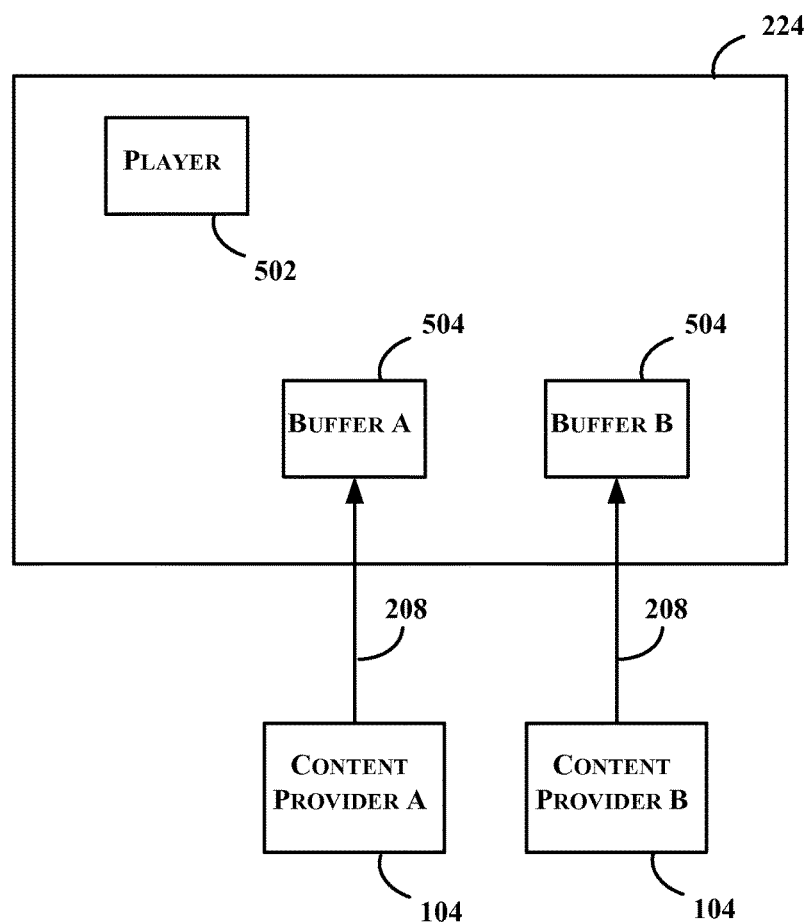

FIG. 5 illustrates direct streaming client-side components for use in accordance with one or more embodiments of the present disclosure. User device comprises a media player 502 and a number of buffers 504. Buffers 504 receive streams, e.g., Internet radio station streams, from different content providers 104 in accordance with tuning commands received from system 102, e.g., from user feeder 214. By way of a non-limiting example, buffer A receives stream A, e.g., an Internet radio station stream, from content provider A, and media player 502 plays the track, track A, from stream A for the user. During this time, the recommender, e.g., media recommender 212, can select another track, e.g., track B, for buffer B. Additionally, during this time, user feeder 214 can transmit a tuning command to the user device 224, the tuning information received by user device 224 is used to tune to stream B, e.g., Internet radio station B, being streamed by content provider B and at least a portion of track B can be stored in buffer B. As track B is being played, media recommender 212 has time to recommend another track for buffer A before track B of buffer B ends. In a case that the user skips the current track, e.g., track A, and at least a portion of track B track is stored in buffer B, the user feeder 214 commands the user device 224 to start playing track B from buffer B and to purge track A from buffer A.

The number of buffers can be expanded beyond two buffers. As the number of buffers increases, the number of skips a user is able to make without waiting for a new track to be tuned in increases. Regardless of the number of buffers, each of the buffers can be used to temporarily store a media content item based on the tuning commands provided by user feeder 214, as discussed above.

In accordance with one or more embodiments, the timing of the recommendation by the media recommender 212 can be based on track length. Track length can be used to ensure that a track is recommended and a tuning command is transmitted in time before playing of the current track ends. Where the current track's length, T, is known, media recommender 212 can be configured to make a recommendation before T-T1, where T1 may be an amount of time used to transmit the tuning command and for the buffer to receive at least a portion of the new track. Where T is not known, a predetermined short time, T', e.g., one minute, which is preferably a time period that is shorter than an average track length, can be used. Where a "good" track is identified during the allotted time and additional time remains while the current track is selected for play, the remaining time may also be used to recommend a "better" track. Assume that buffer A is playing track A and the user feeder 214 transmits a tuning command instructing buffer B to receive and store track B. Where media recommender 212 identifies a track, track B', that is considered to be a better recommendation than track B being received and buffered in buffer B, user feeder 214 can transmit another tuning command to instruct buffer B to purge track B and begin receiving and storing track B'. In such way, good tracks need not be wasted waiting for better ones to come; a currently-recommended track can be replaced with another track that is considered to be a better recommendation during the time, T or T' of the current track.

In accordance with one or more embodiments, in the direct streaming and centralized stream approaches, a seed, e.g., a media content item such as a track, may be used in making a recommendation. A seed may be useful, for example, with a new user or a new session of a registered or known user. System 102 may identify a seed. By way of some non-limiting examples, the system 102 may select a seed based on user preferences, such as without limitation track, artist, genre and the like preferences. A seed may be identified by the user. By way of some non-limiting examples, a user may identify the seed by entering a name or other identifying information for the seed, via a query to the system 102 and selection of one or more seeds from the received results, and/or by searching and identifying media content items stored locally, e.g., at the user device 106, 224 or 646. One or more seeds may be selected from the seed(s) selected by the user and/or the system 102.

Centralized Streaming

In accordance with one or more alternate embodiments, system 102 transmits media content items from media streams received by system 102 to the client device. By way of a non-limiting example, the media content items and media streams might be public domain or freely accessible content. The transmitted items forming a media content stream personalized for the user, which is transmitted to the user's device. The personalized media content stream comprises the media content items identified for the user.

Figure 6:
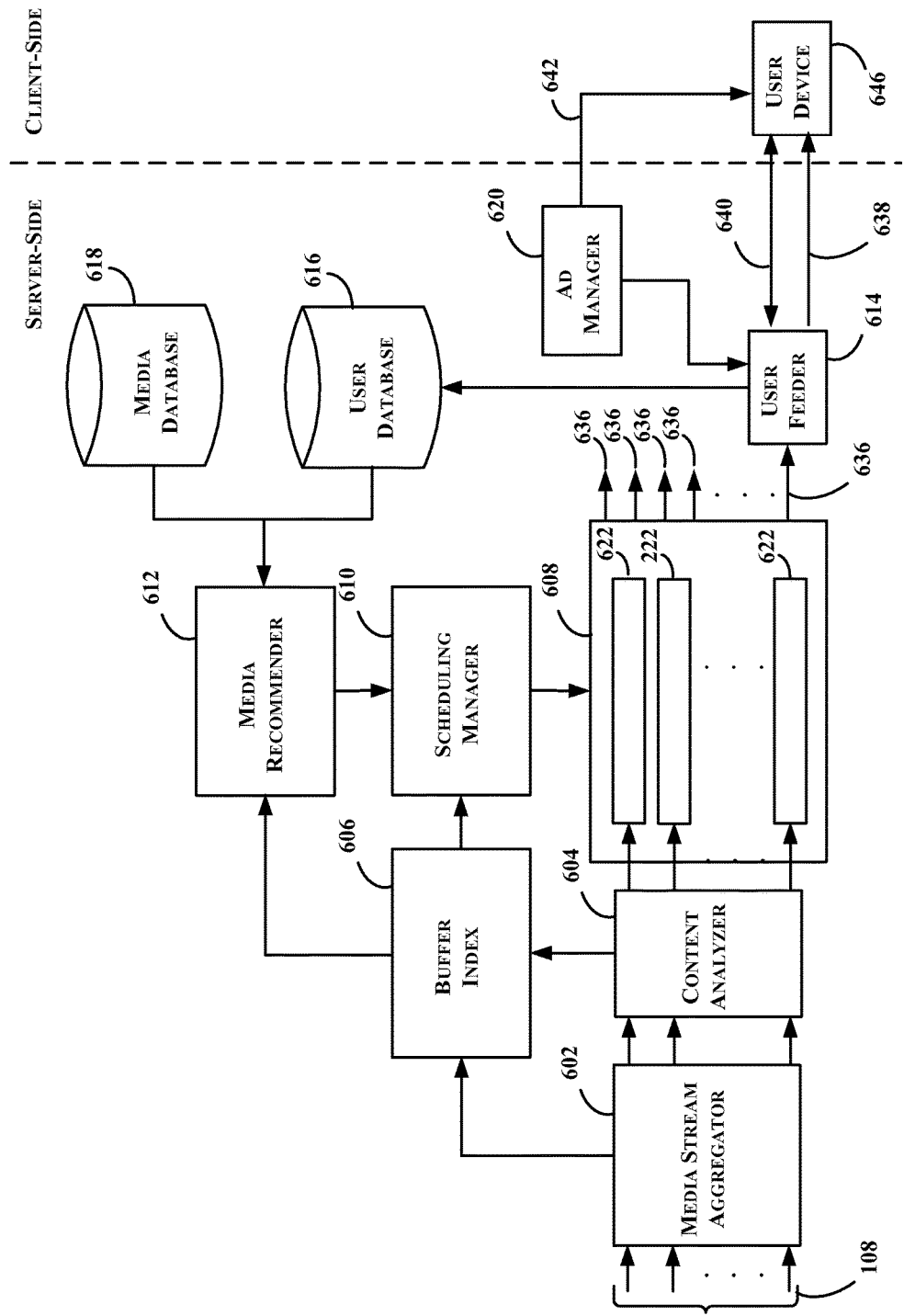

FIG. 6 provides component examples of a system with which media content items from media content streams are scheduled and routed to user devices in accordance with one or more embodiments of the present disclosure. In the example shown in FIG. 6, items of media content received in one or more streams 108 from one or more providers 104 by system 102 are transmitted to a user device 646 in a personalized media content stream for play at user device 646.

In accordance with one or more embodiments, the architecture shown in FIG. 6 can be used to monitor media streams 108 being streamed by content providers 104 and to buffer or otherwise temporarily retain media content items in the media streams in a store such as buffer 608. A buffered media content item identified for inclusion in a personalized media stream can be streamed to the user's device. In accordance with one or more embodiments, media content items received in streams 108 are buffered for a limited brief window of time, and each buffered media content item is purged from the buffer after the expiration of, e.g., outside, the time window.

In the example architecture shown in FIG. 6, a server-side portion comprises one or more server computers having functionality to provide server-side components. A client-side comprises one or more client computing devices, each of which as a media player or other component capable of playing back one or more media content items.

On the server-side, media stream aggregator 602 connects to a plurality of content providers 104, e.g., using a URL for each media content stream. A stream 108 received by media stream aggregator 602 is collected in a buffer, e.g., a jitter buffer, 608. In accordance with one or more embodiments, buffer 608 retains a portion of a media stream corresponding to a predetermined time period or window. By way of a non-limiting example, where the media content comprises tracks having an average length of four minutes, a time period of five to ten minutes would result in approximately one to three tracks being buffered in buffer 608 per media content stream. By extending the buffer 608, e.g., increasing the size of buffer 608 so as to retain more media content items for a given period, or window, of time, more media content items are available for selection and/or recommendation for the users, which can yield an improved quality of service and/or a greater level of user satisfaction over smaller buffer sizes. In accordance with one or more embodiments, where a media content item has been held in a buffer 622 for a predetermined time period, e.g., five to ten minutes, the media content item is purged from the buffer 622.

Media stream aggregator 602 extracts metadata for a media content item being streamed in a media stream 108 from the media stream 108. The extracted metadata is stored in buffer index, such as buffer index 606, and can be used to index and identify the media content items retained in buffer 608. By way of a non-limiting example, where the media content item is a track, the metadata may include such fields as artist name, album name, track title, length in milliseconds, genre, composer name, lyricist name, recording date, beats per minute, provider identifier (ID), and musical key.

Content analyzer 604 can analyze the media content items of the media content streams 108 to provide additional or missing metadata, which is stored in buffer index 606 and used to identify and index the streamed media content items being buffered in buffer 608. By way of a non-limiting example, buffer index 606 comprises a stream number associated with a stream 622 that has media content items in buffer 608, metadata associated with each media content item of stream 622 being maintained in buffer 608 and a timestamp. The timestamp can comprise information that can be used to locate the media content item in the stream 622, which can include, for example and without limitation, a start time, length and/or end time. By way of a non-limiting example, a media content item's start time can be an offset from the start of the stream 622, and the start time and length can be used to identify the media content item's end time. By way of another non-limiting example, a media content item's start time can be determined based on timestamp information of one or more media content item's streamed prior to the media content item. By way of yet another non-limiting example, timestamp information can be determined by media stream aggregator 602 and/or by content analyzer 604.

The media streams 108 provided by the media content providers 104 may have different bit rates, use different encoding (such as MP3, Ogg, or AAC), have different volume levels, etc. Nevertheless, the user will expect a smooth continuous stream with no trace of audio transitions. Where some or all of this information is not otherwise available, content analysis, which may be performed by content analyzer 604 or by a component, such as the media player executing on the user device 646, may be used to determine the missing information. Content analysis may be used to identify a digital signature for a media content item, which can be used as an identifier of the media content item to retrieve information or metadata for the media content item. Content analysis may also be used in identifying track transitions in streams where the metadata and the content are not sufficiently synchronized. Track transitions can be used, for example, to identify where a media content item begins and/or ends in a stream 108. In embodiments in which the media content item is forwarded to the user device 646, track transition information can be used on the serve-side to locate the media content item in a stream 108.

In the example shown in FIG. 6, the media streams 108 are input to the media stream aggregator 602 and the content analyzer 604, and a number of the media content items are buffered as buffered streams 622 via buffer 608. As discussed, the number of media content items being buffered for a given media stream 108 can be dependent on the length of the buffer window and the length of each of the media content items received in the media stream 108, for example.

The buffer index 606 forwards index information, which includes some or all of the information of the media content items being buffered in buffer 608, to media recommender 612 and to scheduling manager 610. In accordance with one or more embodiments, media recommender 612 uses the snapshot information from the buffer index 606 and user information, including user preferences, from the user database 616 to generate, for each user's personalized media stream, a recommended list of media items from the media items residing in the buffer 608. The buffer index 606 identifies the media items currently residing in the buffer 608 at the time that the recommendation is being generated for each user.

Figure 7:
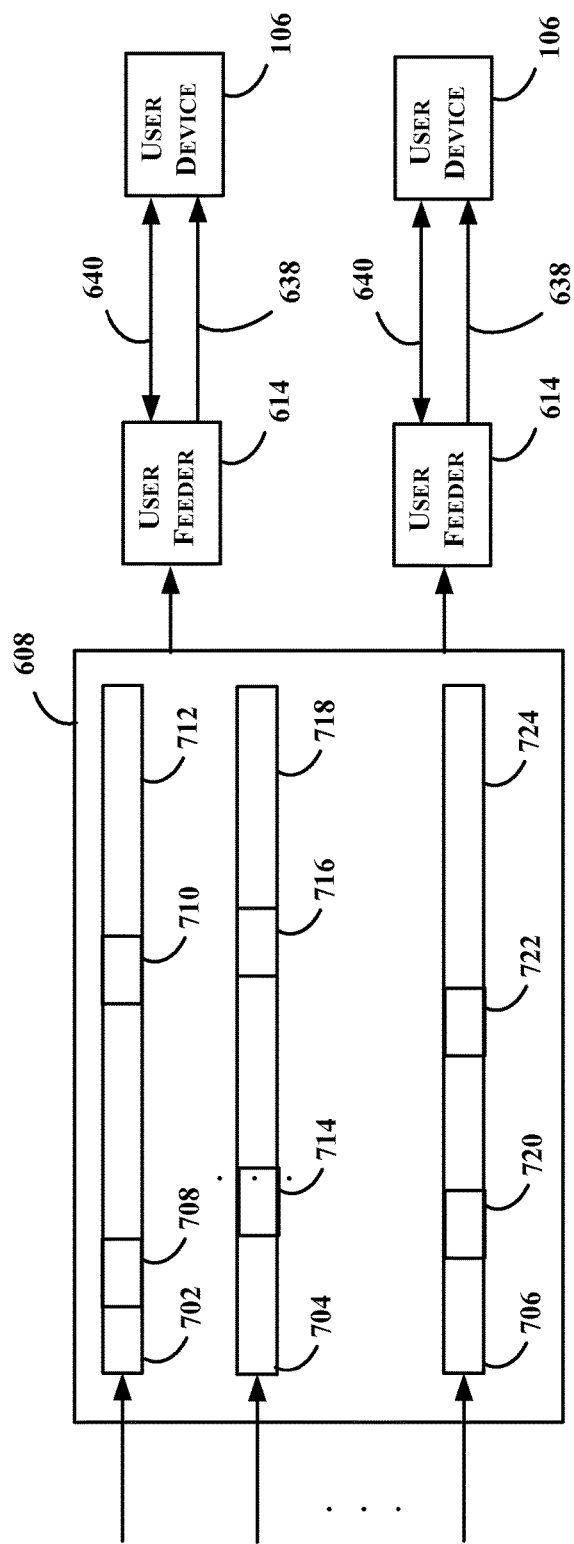

FIG. 7 provides a media stream buffering example in accordance with one or more embodiments of the present disclosure. The example provides an illustration of buffered media streams 702, 704 and 706, each of which can represent all or a portion of a media stream being streamed by a content provider 104 and received by system 102. Media content items 708, 710 and 712 are included in buffered media stream 702, media content items 714, 716 and 718 are included in buffered media stream 704, and media content items 720, 722 and 724 are included in buffered media stream 706. Like any other buffered media content items retained by buffer 608, buffered media content items 708, 710, 712, 714, 716, 718, 720, 722 and 724 are available for identification and inclusion in a personalized media content stream transmitted to a user device 646. By way of one non-limiting example, media content items 708, 710 and 716 can be selected for a personalized media stream fed to a user of device 646, while media content items 708, 714, 712 and 720 can be selected for inclusion in a personalized media stream fed via user feeder 614 to a user of user device 646.

In accordance with one or more embodiments and as shown in the example of FIG. 6, the media recommender 612 may use information from media database 618 with the snapshot information from the buffer index 606 and user information from the user database 616 to generate a recommended list of media items from the media items residing in the buffer 608 for each user's personalized media stream. In accordance with one or more such embodiments, the media database 618 can comprise a plurality of media items and feature, e.g., metadata, information for each of the plurality of media items. Optionally, in accordance with one or more embodiments, media content from media database 618 can be incorporated into a user's personalized media stream. By way of a non-limiting example, a media content item stored in media database 618 can be used in place of a buffered media content item, e.g., the stored media content item is a better quality rendering of the buffered media content item, or is more relevant to the user's preferences than one or more of the buffered media content items.

Media recommender 612 forwards its recommendations for each user to scheduling manager 610. The scheduling manager 610 generates a scheduling plan and routes media content items, via transmission 636, to each user's user feeder 614 for transmission to the user's device 646. By way of a non-limiting example, the scheduling manager 610 can schedule media content items in accordance with the recommendations from media recommender 612 using a first-in-first-out (FIFO) scheme, so that the media content items buffered the longest are fed to the user's feeder for streaming, via transmission 636, to the user device 646. It should be apparent that any scheme can be used by scheduling manager 610 for the selection ordering of buffered media content items, such as without limitation a scheme that is based on a score identifying the user's interest in each of the media content items for selection by the scheduling manager 610.

The user feeder 614 is in communication with user device 646, e.g., a media player executing on the user device 646, and transmits via transmission 638, the media content items in an order and according to the scheduling provided by the scheduling manager 610. The user feeder 614 can transmit and receive control and status information and receive user feedback via transmission 640. The user feeder 614 forwards the user feedback to user database 616.

In accordance with one or more embodiments, an ad manager 620 can transmit one or more ads, e.g., in-band ads, to the user feeder 614 for inclusion in the media content item streaming transmitted to the user device 646 via transmission 638. Additionally or alternatively, the ad manager 620 can server one or more ads directly to the user device via transmission 642.

In accordance with one or more embodiments, transmissions 638, 640 and 642 are network transmissions, which can be made via any type of network. The network may couple devices so that communications may be exchanged, such as between a server computer comprising the user feeder 614 functionality and a user device 646 or other types of devices, including between wireless devices coupled via a wireless network, for example.

In accordance with one or more embodiments, FIG. 3 can be used to generate a personalized media stream with a centralized streaming approach. With the direct streaming approach, in accordance with one or more embodiments, step 312 of FIG. 3 can be modified to transmit the media content items identified by the media recommender 612. In accordance with one or more such embodiments, the modified step 312 can correspond to step 816 described below in connection with FIG. 8.

Figure 8:
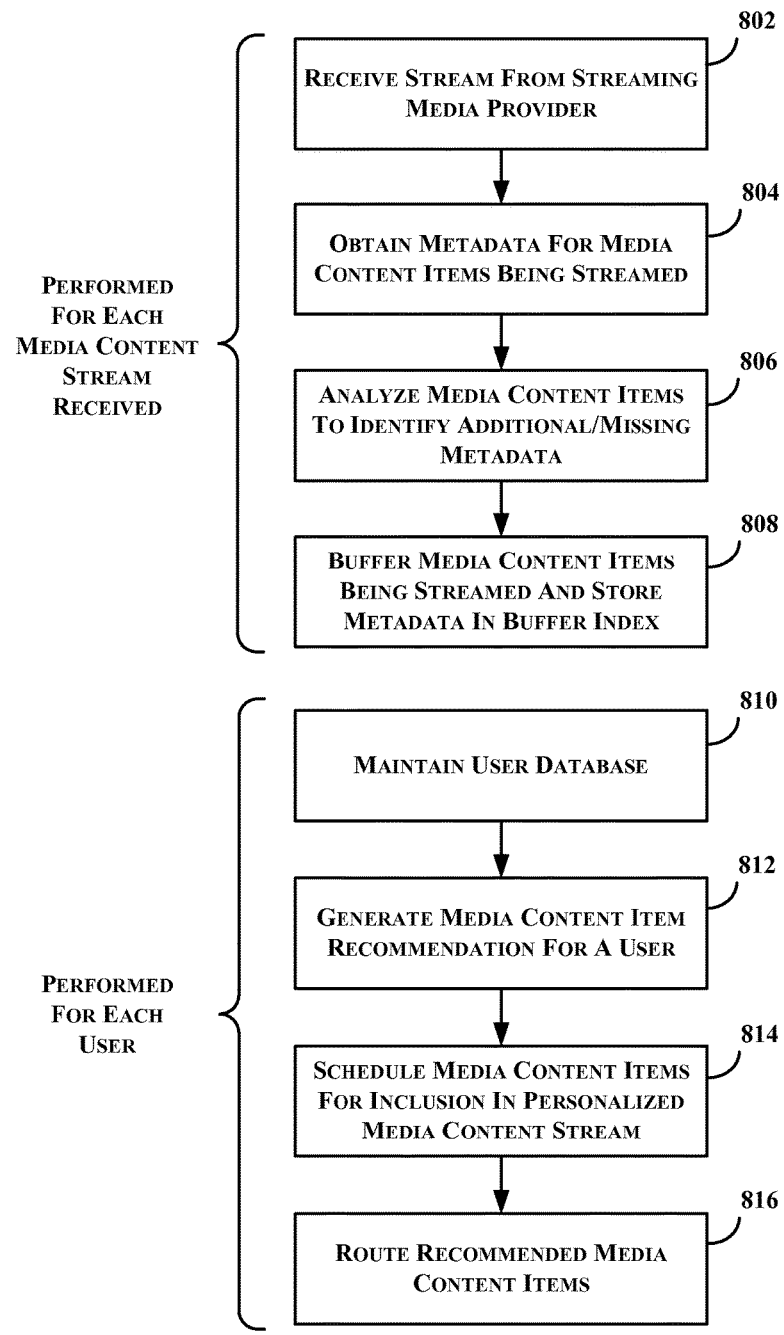

FIG. 8 provides a centralized streaming process flow example with which media content items from media content streams are scheduled and routing to user devices in accordance with one or more embodiments of the present disclosure. The process flow can be implemented as functionality of the server-side components shown in FIG. 6, for example. In the example shown in FIG. 8, steps 802, 804, 806 and 808 are performed for each media content stream 108 received by system 102; and steps 810, 812, 814 and 816 are performed for each user for which a personalized media stream is to be generated, e.g., each user logged in or otherwise accessing the system 102, such as via a web site or web page. Of course it should be apparent that the client side can be implemented by any type of application, including a web application or dedicated application, for example.

At step 802, media stream aggregator 102 receives streams 108 from providers 104. At step 804, media stream aggregator 602 extracts metadata for media content items being streamed in a media stream 108 from the media stream 108. The extracted metadata is stored in buffer index, such as buffer index 606, and can be used to index and identify the media content items retained in buffer 608. By way of a non-limiting example, where the media content item is a track, the metadata may include such fields as artist name, album name, track title, length in milliseconds, genre, composer name, lyricist name, recording date, beats per minute, provider identifier (ID), and musical key.

At step 806, one or more media content items being streamed in a media stream 108 can be analyzed by, for example, content analyzer 604. The content analysis can be used to obtain additional metadata or metadata that was not extractable from the media stream 108, for example. The metadata obtained analyzing the media content item can be stored in buffer index 606 and used to identify and index the streamed media content items being buffered in buffer 608. As discussed herein, the buffer index 606 can store a stream number associated with a stream 622 that has media content items in buffer 608, metadata associated with each media content item of stream 622 being maintained in buffer 608 and a timestamp. The timestamp can comprise information that can be used to locate the media content item in the stream 622, which can be a portion of a stream 108. By way of yet another non-limiting example, timestamp information can be determined by media stream aggregator 602 and/or by content analyzer 604.

At step 808, media content items received in streams 108 are buffered, e.g., temporarily stored for a predetermined time period in buffer 608, and information, including metadata, is stored in a buffer index 606.

At step 810, a user database, e.g., database 616, is maintained and includes user profiles. Each user profile can include user preferences including media content preferences. At step 812, a media content item recommendation is generated, e.g., by media recommender 612. The media content item recommendation can be generated in response to the user logging into system 102 and/or accessing a web page provided by system 102. In accordance with one or more embodiments, media recommender 612 uses the buffer index 606 and user information, including user preferences, from the user database 616 to generate, for each user's personalized media stream, a recommended list of media content items from the media content items residing in the buffer 608. The buffer index 606 identifies the media content items currently residing in the buffer 608 at the time that the recommendation is being generated for a user.

At step 814, scheduling manager 610 receives the media content item recommendations from media recommender 612, and selects media content items from buffer 108 identified by media recommender 612 for the user. Scheduling manager 610 can select media content items using a score or ranking information associated with each media content item which identifies a level or likelihood of interest by the user in the media content item. The scheduling manager 610 can also take into account sound recording performance restrictions, such as those that might be imposed in connection with the Digital Millennium Copyright Act or other. The scheduling manager 610 may also schedule media content items for inclusion in a user's personalized media content stream using on-demand or other requests made by the user.

At step 816, the media content items scheduled by scheduling manager 610 are transmitted to the user device 646 from buffer 608 via user feeder 614.

Figure 9:
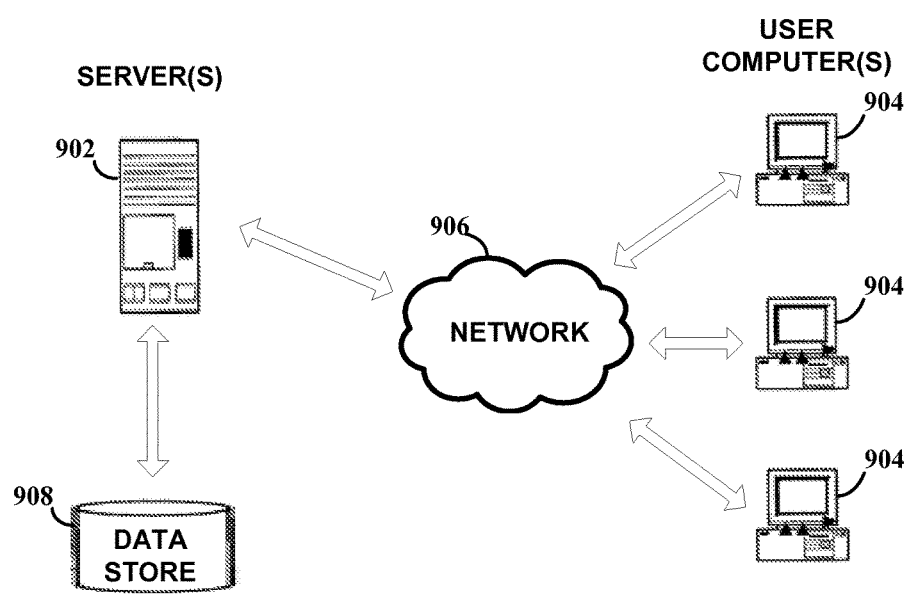
FIG. 9 illustrates some components that can be used in connection with one or more embodiments of the present disclosure.

FIG. 9 illustrates some components that can be used in connection with one or more embodiments of the present disclosure. In accordance with one or more embodiments of the present disclosure, one or more computing devices, e.g., one or more servers, user devices 106, 224 and/or 646 or other computing device, are configured to comprise functionality described herein. For example, a computing device 902 can be configured to execute program code, instructions, etc. to provide functionality in accordance with one or more embodiments of the present disclosure. The same or another computing device 902 can be configured as to implement functionality of components of system 102.

Computing device 902 can serve content to user computing devices 904 using a browser and/or player application via a network 906. Data store 908, which can include but is not limited to media database 618, user database 616, advertisement store, etc., can be used to store data, program code to configure a server 902 to execute functionality described herein, configuration information, etc.

The user computing device 904, and/or user devices 106, 224 and/or 646, can be any computing device, including without limitation a personal computer, personal digital assistant (PDA), wireless device, cell phone, internet appliance, media player, home theater system, and media center, or the like. Computing device 904 can be any device that is connected to the Internet and has multimedia play capabilities such as and without limitation desktops, laptops, tablets, or smart phone. For the purposes of this disclosure a computing device includes a processor and memory for storing and executing program code, data and software, and may be provided with an operating system that allows the execution of software applications in order to manipulate data. A computing device such as server 902 and the user computing device 904 can include one or more processors, memory, a removable media reader, network interface, display and interface, and one or more input devices, e.g., keyboard, keypad, mouse, etc. and input device interface, for example. One skilled in the art will recognize that server 902 and user computing device 904 may be configured in many different ways and implemented using many different combinations of hardware, software, or firmware.

In accordance with one or more embodiments, a computing device 902 can make a user interface available to a user computing device 904 via the network 906. The user interface made available to the user computing device 904 can include content items, or identifiers (e.g., URLs) selected for the user interface in accordance with one or more embodiments of the present invention. In accordance with one or more embodiments, computing device 902 makes a user interface available to a user computing device 904 by communicating a definition of the user interface to the user computing device 904 via the network 906. The user interface definition can be specified using any of a number of languages, including without limitation a markup language such as Hypertext Markup Language, scripts, applets and the like. The user interface definition can be processed by an application executing on the user computing device 904, such as a browser application, to output the user interface on a display coupled, e.g., a display directly or indirectly connected, to the user computing device 904.

In an embodiment, the network 906 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 6nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 9. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 10:
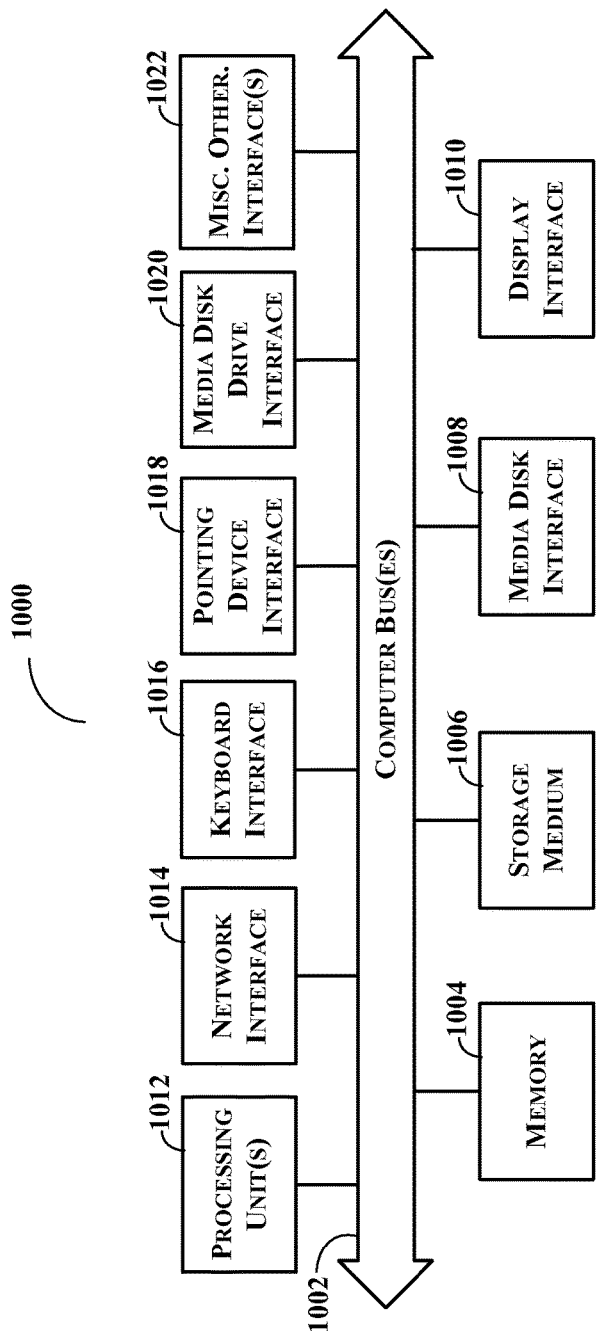
FIG. 10 is a detailed block diagram illustrating an internal architecture of a computing device in accordance with one or more embodiments of the present disclosure.

FIG. 10 is a detailed block diagram illustrating an internal architecture of a computing device, e.g., a computing device such as server 902 or user computing device 904, in accordance with one or more embodiments of the present disclosure. As shown in FIG. 10, internal architecture 1000 includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), etc., media disk drive interface 1020 as an interface for a drive that can read and/or write to media including removable media such as floppy, CD-ROM, DVD, etc. media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, computer-readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. The method comprising:
   maintaining, by at least one server computer, a user database comprising user information for a plurality of users, the user information comprising media content user preferences;
   receiving, by the at least one server computer via an electronic communications network, a plurality of media content streams from a plurality of streaming media content providers, each media content stream of the plurality comprising a subset of a plurality of media content items, the received plurality of media content streams being used to identify a personalized media content stream for each user of a plurality of users;
   as the media content streams of the plurality are being received by the at least one server computer from the plurality of streaming media content providers via the electronic communications network, the at least one server computer:
      storing a number of media content items from the received media content streams in a buffer;
      creating a buffer index identifying each buffered media content item of the number stored in the buffer, creation of the buffer index comprising:
         analyzing each received media content stream including a buffered media content item to identify metadata identifying the buffered media content item;
         extracting the metadata identified for each buffered media content item; and
         storing the extracted metadata for each buffered media content item in the buffer index, the stored metadata being organized to be readable by a media recommender so as to enable the media recommender to select at least one of the buffered media content items for inclusion in the user's personalized media content stream;
   generating, by the media recommender, the personalized media content stream for each user of the plurality of users, generation by the media recommender of the personalized media content stream for a user comprising the media recommender accessing the buffer index and the media content user preferences for the user to select, for the user's personalized media content stream, at least one buffered media content item having metadata, from the buffer index, corresponding to the media content user preferences of the user;
   transmitting, for each user of the plurality and via the electronic communications network to the user's computing device, an identifier of each buffered media content item selected for the user's personalized media content stream.

2. The method of claim 1, further comprising:
   identifying, via the at least one server computer, at least one advertisement for play back with the personalized media content stream.

3. The method of claim 1, wherein a universal resource locator is for use to buffer a corresponding media content stream at the user's computing device before being played.

4. The method of claim 1, the extracting further comprising:
   extracting the metadata for a buffered media content item from the plurality of media content streams in accordance with a media stream protocol.

5. The method of claim 1, wherein the identifier of a buffered media content item selected for the user's personalized media content stream identifies its location.

6. A system comprising:
   at least one server computer, each server computer comprising one or more processors and a storage medium for tangibly storing thereon program logic for execution by the one or more processors, the stored program logic comprising:
      maintaining logic executed by the one or more processors for maintaining a user database comprising user information for a plurality of users, the user information comprising media content user preferences;
      receiving logic executed by the one or more processors for receiving via an electronic communications network a plurality of media content streams from a plurality of streaming media content providers, each media content stream of the plurality comprising a subset of a plurality of media content items, the received plurality of media content streams being used to identify a personalized media content stream for each user of a plurality of users;
      as the media content streams of the plurality are being received by the at least one server from the plurality of streaming media content providers via the electronic communications network:
         storing logic executed by the one or more processors for storing a number of media content items from the received media content streams in a buffer;
         creating logic executed by the one or more processors for creating a buffer index identifying each buffered media content item of the number stored in the buffer, creation of the buffer index comprising:
            analyzing logic executed by the one or more processors for analyzing each received media content stream including a buffered media content item to identify metadata identifying the buffered media content item;
            extracting logic executed by the one or more processors for extracting the metadata identified for each buffered media content item; and
            storing logic executed by the one or more processors for storing the extracted metadata for each buffered media content item in the buffer index, the stored metadata being organized to be readable by a media recommender so as to enable the media recommender to select at least one of the buffered media content items for inclusion in the user's personalized media content stream;
         generating logic executed by the one or more processors for generating, by the media recommender, the personalized media content stream for each user of the plurality of users, generation by the media recommender of the personalized media content stream for a user comprising the media recommender accessing the buffer index and the media content user preferences for the user to select, for the user's personalized media content stream, at least one buffered media content item having metadata, from the buffer index, corresponding to the media content user preferences of the user; and
         transmitting logic executed by the one or more processors for transmitting, for each user of the plurality and via the electronic communications network to the user's computing device, an identifier of each buffered media content item selected for the user's personalized media content stream.

7. The system of claim 6, the stored program logic further comprising:
   identifying logic executed by the one or more processors for identifying at least one advertisement for play back with the personalized media content stream.

8. The system of claim 6, wherein a universal resource locator is for use to buffer a corresponding media content stream at the user's computing device before being played.

9. The system of claim 6, the extracting logic executed by the one or more processors for extracting further comprising:
   extracting logic executed by the one or more processors for extracting the metadata for a buffered media content item from the plurality of media content streams in accordance with a media stream protocol.

10. A computer readable non-transitory storage medium for tangibly storing thereon computer readable instructions that when executed cause at least one processor to:
    maintain, by a server computer, a user database comprising user information for a plurality of users, the user information comprising media content user preferences;
    receive, by a server computer via an electronic communications network, a plurality of media content streams from a plurality of streaming media content providers, each media content stream of the plurality comprising a subset of a plurality of media content items, the received plurality of media content streams being used to identify a personalized media content stream for each user of a plurality of users;
    as the media content streams of the plurality are being received by the at least one server computer from the plurality of streaming media content providers via an electronic communications network:
       store a number of media content items from the received media content streams in a buffer;
       create a buffer index identifying each buffered media content item of the number stored in the buffer, creation of the buffer index comprising:
          analyzing each received media content stream including a buffered media content item to identify metadata identifying the buffered media content item;
          extracting the metadata identified for each buffered media content item; and
          storing the extracted metadata for each buffered media content item in the buffer index, the stored metadata being organized to be readable by a media recommender so as to enable the media recommender to select at least one of the buffered media content items for inclusion in the user's personalized media content stream;

generate, by the media recommender, the personalized media content stream for each user of the plurality of users, generation by the media recommender of the personalized media content stream for a user comprising the media recommender accessing the buffer index and the media content user preferences for the user to select, for the user's personalized media content stream, at least one buffered media content item having metadata, from the buffer index, corresponding to the media content user preferences of the user; and transmit, for each user of the plurality and via the electronic communications network to the user's computing device, an identifier of each buffered media content item selected for the user's personalized media content stream.

11. The computer readable non-transitory storage medium of claim 10, the instructions further comprising instructions to:

identify at least one advertisement for play back with the personalized media content stream.

12. The computer readable non-transitory storage medium of claim 10, wherein a universal resource locator is for use to buffer a corresponding media content stream at the user's computing device before being played.

13. The computer readable non-transitory storage medium of claim 10, the instructions to extract further comprising instructions to:

extract the metadata for a buffered media content item from the plurality of media content streams in accordance with a media stream protocol.

14. A method comprising:

receiving, by a media player at a user computing device from at least one server computer of a personalized media content stream identification service and via an electronic communications network, a plurality of tuning commands for a plurality of media content streams of a plurality of media content providers, the plurality of media content providers are other than a provider providing the personalized media content stream identification service that is providing the plurality of tuning commands, the plurality of media content streams providing a plurality of media content items, each tuning command of the plurality including a universal resource locator identifying one of the plurality of media content streams and at least one media content item that is to be received at the user computing device for the user's personalized media stream, the user computing device receiving a subset of the plurality of media content items;

accessing, by the media player at the user computing device and for each received tuning command, the media content stream of a media content provider of the plurality using the universal resource locator to receive a media content item contained in the media content stream;

playing, by the media player at the user computing device, a first received media content item from a first media content stream as part of the user's personalized media stream;

buffering, by the media player at the user computing device, at least one other media content item from at least one media content stream different from the first media content stream while the first media content item is selected for play; and determining, by the media player at the user computing device, using a preset schedule, an order to play a next media content item from the buffered at least one other media content item, the determining comprising determining whether to alter the order of play indicated by the preset schedule using a ranking of the next media content item relative to another media content item scheduled for play, the ranking indicating a level of interest of the user in the next media content item relative to the other media content item.

15. The method of claim 14, wherein the tuning command for a second media content item is received by the user computing device while the first media content item is selected for play.

16. The method of claim 14, wherein the tuning command for a third media content item is received by the user computing device while the first media content item is selected for play, the tuning command for the third media content item including a command to replace the second media content item with the third media content item, the method further comprising:

purging, by the user computer device, a buffer being used to temporarily store the second media content item;

accessing, by the user computing device using the tuning command for the third media content item, the media content stream to receive the third media content item contained in the media content stream; and buffering, by the user computing device, the third media content item.

17. The method of claim 14, the buffering at least one media content item further comprising:

using, by the user computing device, multiple buffers to synchronize play of a plurality of media content items received from different media content streams of the plurality of media content streams.

18. A user device comprising:

one or more processors and a storage medium for tangibly storing thereon program logic for execution by the one or more processors, the stored program logic comprising:

receiving logic executed by the one or more processors for receiving, by a media player at the user device from at least one server computer of a personalized media content stream identification service and via an electronic communications network, a plurality of tuning commands for a plurality of media content streams of a plurality of media content providers, the plurality of media content providers are other than a provider providing the personalized media content stream identification service that is providing the plurality of tuning commands, the plurality of media content streams providing a plurality of media content items, each tuning command of the plurality including a universal resource locator identifying one of the plurality of media content streams and at least one media content item that is to be received at the user computing device for the user's personalized media stream, the user computing device receiving a subset of the plurality of media content items;

accessing logic executed by the one or more processors for accessing, by the media player at the user device and for each received tuning command, the media content stream of media content provider of the plurality using the universal resource locator to receive a media content item contained in the media content stream;

playing logic executed by the one or more processors for playing, by the media player at the user device, a first received media content item from a first media content stream as part of the user's personalized media stream;

buffering logic executed by the one or more processors for buffering, by the media player at the user device, at least one other media content item from at least one media content stream different from the first media content stream while the first media content item is selected for play; and determining logic executed by the one or more processors for determining, by the media player at the user computing device, using a preset schedule, an order to play a next media content item from the buffered at least one other media content item, the determining comprising determining whether to alter the order of play indicated by the preset schedule using a ranking of the next media content item relative to another media content item scheduled for play, the ranking indicating a level of interest of the user in the next media content item relative to the other media content item.

19. The user device of claim 18, wherein the tuning command for a second media content item is received by the user computing device while the first media content item is selected for play.

20. The user device of claim 18, wherein the tuning command for a third media content item is received while the first media content item is selected for play, the tuning command for the third media content item including a command to replace the second media content item with the third media content item, the stored program logic further comprising:

purging logic executed by the one or more processors for purging a buffer being used to temporarily store the second media content item;

accessing logic executed by the one or more processors for accessing, using the tuning command for the third media content item, the media content stream to receive the third media content item contained in the media content stream; and buffering logic executed by the one or more processors for buffering the third media content item.

21. The user device of claim 18, the buffering logic executed by the one or more processors for buffering at least one media content item further comprising:

using logic executed by the one or more processors for using multiple buffers to synchronize play of a plurality of media content items received from different media content streams of the plurality of media content streams.

22. A computer readable non-transitory storage medium for tangibly storing thereon computer readable instructions that when executed cause at least one processor to:

receive, by a media player at a user computing device from at least one server computer of a personalized media content stream identification service and via an electronic communications network, a plurality of tuning commands for a plurality of media content streams of a plurality of media content providers, the plurality of media content providers are other than a provider providing the personalized media content stream identification service that is providing the plurality of tuning commands, the plurality of media content streams providing a plurality of media content items, each tuning command of the plurality including a universal resource locator identifying one of the plurality of media content streams and at least one media content item that is to be received at the user computing device for the user's personalized media stream, the user computing device receiving a subset of the plurality of media content items;

access, by the media player and for each received tuning command, the media content stream of a media content provider of the plurality using the universal resource locator to receive a media content item contained in the media content stream;

play, by the media player, a first received media content item from a first media content stream as part of the user's personalized media stream;

buffer, by the media player, at least one other media content item from at least one media content stream different from the first media content stream while the first media content item is selected for play; and determine, by the media player, using a preset schedule, an order to play a next media content item from the buffered at least one other media content item, the determining comprising determining whether to alter the order of play indicated by the preset schedule using a ranking of the next media content item relative to another media content item scheduled for play, the ranking indicating a level of interest of the user in the next media content item relative to the other media content item.

23. The computer readable non-transitory storage medium of claim 22, wherein the tuning command for a second media content item is received by the user computing device while the first media content item is selected for play.

24. The computer readable non-transitory storage medium of claim 22, wherein the tuning command for a third media content item is received while the first media content item is selected for play, the tuning command for the third media content item including a command to replace the second media content item with the third media content item, the instructions further comprising instructions to:

purge a buffer being used to temporarily store the second media content item;

access, using the tuning command for the third media content item, the media content stream to receive the third media content item contained in the media content stream; and buffer the third media content item.

25. The computer readable non-transitory storage medium of claim 22, the instructions to buffer at least one media content item further comprising instructions to:

use multiple buffers to synchronize play of a plurality of media content items received from different media content streams of the plurality of media content streams.

26. A method comprising:

maintaining, by at least one server computer, a user database comprising user information for a plurality of users, the user information comprising media content user preferences;

receiving, by the at least one server computer via an electronic communications network, a plurality of media content streams from a plurality of streaming media content providers, each media content stream of the plurality comprising a subset of a plurality of media content items, the received plurality of media content streams being used to identify a personalized media content stream for each user of a plurality of users;

as the media content streams of the plurality are being received by the at least one server computer from the plurality of streaming media content providers via the electronic communications network, the at least one server computer:
  temporarily storing, in at least one buffer, a number of media content items from the received media content streams;
  creating a buffer index of the at least one buffer, the buffer index identifying each buffered media content item of the number stored in the buffer at least one buffer, creation of the buffer index comprising:
    analyzing each received media content stream including a buffered media content item to identify metadata identifying the buffered media content item;
    extracting the metadata identified for each buffered media content item; and
    storing the extracted metadata for each buffered media content item in the buffer index, the stored metadata being organized to be readable by a media recommender so as to enable the media recommender to select at least one of the buffered media content items for inclusion in the user's personalized media content stream;
  generating, by the media recommender, the personalized media content stream for each user of the plurality of users, generation by the media recommender of the personalized media content stream for a user comprising the media recommender accessing the buffer index and the media content user preferences for the user to select, for the user's personalized media content stream, at least one buffered media content item having metadata, from the buffer index, corresponding to the media content user preferences of the user;
  transmitting, a single media content stream via the at least one electronic communications network to each user's computing device, the single media content stream transmitted to the user's computing device comprising the at least one buffered media content item identified for the personalized media content stream; and
  removing, via the at least one server computer, each buffered media content item temporarily stored in the at least one buffer where the buffered media content item has been stored for a predetermined period of time.

27. A system comprising:
at least one server computer, each server computer comprising one or more processors and a storage medium for tangibly storing thereon program logic for execution by the one or more processors, the stored program logic comprising:
  maintaining logic executed by the one or more processors for maintaining a user database comprising user information for a plurality of users, the user information comprising media content user preferences;
  receiving logic executed by the one or more processors for receiving, by the at least one server computer via an electronic communications network, a plurality of media content streams from a plurality of streaming media content providers, each media content stream of the plurality comprising a subset of a plurality of media content items, the received plurality of media content streams being used to identify a personalized media content stream for each user of a plurality of users;
  as the media content streams of the plurality are being received by the at least one server computer from the plurality of streaming media content providers via the electronic communications network, the at least one server computer:
    storing logic executed by the one or more processors for temporarily storing, using at least one buffer, a number of media content items from the received media content streams;
    creating logic executed by the one or more processors for creating a buffer index for the at least one buffer, the buffer index identifying each buffered media content item of the number stored in the buffer at least one buffer, creation of the buffer index comprising:
      analyzing logic executed by the one or more processors for analyzing each received media content stream including a buffered media content item to identify metadata identifying the buffered media content item;
      extracting logic executed by the one or more processors for extracting the metadata identified for each buffered media content item; and
      storing logic executed by the one or more processors for storing the extracted metadata for each buffered media content item in the buffer index, the stored metadata being organized to be readable by a media recommender so as to enable the media recommender to select at least one of the buffered media content items for inclusion in the user's personalized media content stream;
    generating logic executed by the one or more processors for generating, by the media recommender, the personalized media content stream for each user of the plurality of users, generation by the media recommender of the personalized media content stream for a user comprising the media recommender accessing the buffer index and the media content user preferences for the user to select at least one buffered media content item having metadata, from the buffer index, corresponding to the media content user preferences of the user;
    transmitting logic executed by the one or more processors for transmitting, a single media content stream to each user's computing device via the electronic communications network to each user's computing device, the single media content stream transmitted to the user's computing device comprising the at least one buffered media content item identified for the personalized media content stream; and
    removing logic executed by the one or more processors for removing each buffered media content item temporarily stored in the at least one buffer where the buffered media content item has been stored for a predetermined period of time.

28. A computer readable non-transitory storage medium for tangibly storing thereon computer readable instructions that when executed:
  cause at least one processor of at least one server computing device to:
    maintain a user database comprising user information for a plurality of users, the user information comprising media content user preferences;
    receive, by the at least one server computing device via an electronic communications network, a plurality of media content streams from a plurality of streaming media content providers, each media content stream of the plurality comprising a subset of a plurality of media content items, the received plurality of media content streams being used to identify a personalized media content stream for each user of a plurality of users;

as the media content streams of the plurality are being received by the at least one server computer from the plurality of streaming media content providers via the electronic communications network, the at least one server computer:

temporarily store, using at least one buffer, a number of media content items from the received media content streams;

create an index for the at least one buffer, the buffer index identifying each buffered media content item of the number stored in the buffer at least one buffer, creation of the buffer index comprising:

analyzing each received media content stream including a buffered media content item to identify metadata identifying the buffered media content item;

extracting the metadata identified for each buffered media content item; and storing the extracted metadata for each buffered media content item in the buffer index, the stored metadata being organized to be readable by a media recommender so as to enable the media recommender to select at least one of the buffered media content items for inclusion in the user's personalized media content stream;

generate, by the media recommender, the personalized media content stream for each user of the plurality of users, generation by the media recommender of the personalized media content stream for a user comprising the media recommender accessing the buffer index and the media content user preferences for the user to select at least one media content item having metadata, from the buffer index, corresponding to the media content user preferences of the user;

transmit, a single media content stream via the electronic communications network to each user's computing device, the single media content stream transmitted to the user's computing device comprising the at least one buffered media content item identified for the personalized media content stream; and remove each buffered media content item temporarily stored in the at least one buffer where the buffered media content item has been stored for a predetermined period of time.

* * * * *